United States Patent
Shingai

(10) Patent No.: US 12,391,903 B2
(45) Date of Patent: Aug. 19, 2025

(54) CLEANING LIQUID FOR EXCESSIVE POWDER REMOVAL, METHOD FOR PRODUCING THREE-DIMENSIONAL MOLDED OBJECT, AND SET OF OBJECT MOLDING LIQUID AND CLEANING LIQUID

(71) Applicant: Yuki Shingai, Kanagawa (JP)

(72) Inventor: Yuki Shingai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 72 days.

(21) Appl. No.: 18/182,014

(22) Filed: Mar. 10, 2023

(65) Prior Publication Data

US 2023/0287311 A1 Sep. 14, 2023

(30) Foreign Application Priority Data

Mar. 14, 2022 (JP) .................. 2022-039185

(51) Int. Cl.
| | | |
|---|---|---|
| *C11D 7/50* | (2006.01) | |
| *B29C 64/35* | (2017.01) | |
| *B33Y 40/20* | (2020.01) | |
| *C09D 7/20* | (2018.01) | |
| *C09D 131/04* | (2006.01) | |
| *C09D 139/06* | (2006.01) | |
| *C11D 7/24* | (2006.01) | |
| *B29C 64/165* | (2017.01) | |

(52) U.S. Cl.
CPC ............ *C11D 7/5027* (2013.01); *B29C 64/35* (2017.08); *B33Y 40/20* (2020.01); *C09D 7/20* (2018.01); *C09D 131/04* (2013.01); *C09D 139/06* (2013.01); *C11D 7/241* (2013.01); *C11D 7/245* (2013.01); *B29C 64/165* (2017.08); *C11D 2111/18* (2024.01)

(58) Field of Classification Search
CPC ....... B29C 64/35; B29C 64/165; B33Y 40/20; C11D 7/5027; C11D 7/241; C11D 7/245; C09D 7/20; C09D 131/04; C09D 139/06
See application file for complete search history.

(56) References Cited

U.S. PATENT DOCUMENTS

| | | |
|---|---|---|
| 9,926,580 B2 | 3/2018 | Yajima et al. |
| 2010/0093589 A1 | 4/2010 | Yoshikawa et al. |

(Continued)

FOREIGN PATENT DOCUMENTS

| | | |
|---|---|---|
| CN | 111471538 | 7/2020 |
| EP | 0 537 736 | 4/1993 |

(Continued)

OTHER PUBLICATIONS

U.S. Appl. No. 18/149,368, filed Mar. 1, 2023, Koji Takimoto, et al.

(Continued)

*Primary Examiner* — Mathieu D Vargot
(74) *Attorney, Agent, or Firm* — Grüneberg and Myers PLLC

(57) ABSTRACT

A cleaning liquid for excessive powder removal is provided. The cleaning liquid includes a hydrocarbon solvent having an octanol/water partition coefficient (log $P_{ow}$ value) of 4.5 or more. The cleaning liquid is to remove excessive powder for molding adhering to a solidified object molded using the powder for molding.

20 Claims, 16 Drawing Sheets

(56) References Cited

U.S. PATENT DOCUMENTS

| | | |
|---|---|---|
| 2016/0243805 A1 | 8/2016 | Satoh |
| 2017/0120521 A1 | 5/2017 | Sakura et al. |
| 2017/0259456 A1 | 9/2017 | Sasaki et al. |
| 2018/0036945 A1* | 2/2018 | Lereboullet ............ C03B 19/06 |
| 2020/0114577 A1 | 4/2020 | Satoh |
| 2020/0290270 A1 | 9/2020 | Akira et al. |
| 2020/0298476 A1 | 9/2020 | Saito et al. |
| 2021/0001543 A1 | 1/2021 | Sogame et al. |
| 2021/0292511 A1 | 9/2021 | Satoh |
| 2021/0299953 A1 | 9/2021 | Nagatomo et al. |
| 2022/0032540 A1 | 2/2022 | Kamoda et al. |
| 2022/0112329 A1 | 4/2022 | Satoh et al. |
| 2022/0282080 A1 | 9/2022 | Yuki et al. |
| 2022/0305557 A1 | 9/2022 | Satoh et al. |
| 2023/0036748 A1 | 2/2023 | Miyazaki et al. |

FOREIGN PATENT DOCUMENTS

| | | |
|---|---|---|
| EP | 0 913 464 A1 | 5/1999 |
| JP | 2000-505737 | 5/2000 |
| JP | 2021-146569 | 9/2021 |
| JP | 2021-146669 | 9/2021 |
| JP | 2022-135572 | 9/2022 |
| WO | WO98/009798 | 3/1998 |
| WO | PCT WO 2005/105164 | * 11/2005 |
| WO | PCT WO 2009/073816 | * 6/2009 |

OTHER PUBLICATIONS

U.S. Appl. No. 18/048,133, filed Oct. 20, 2022, Hisataka takagi, et al.

Extended European Search Report received for European Patent Application No. 23161437.1, mailed on Aug. 4, 2023, 9 pages.

Communication issued in European Patent Application No. 23161437.1, issued Mar. 31, 2025, 7 pages.

* cited by examiner

COMPARATIVE EXAMPLE

COMPARATIVE EXAMPLE

COMPARATIVE EXAMPLE

COMPARATIVE EXAMPLE

COMPARATIVE EXAMPLE

COMPARATIVE EXAMPLE

COMPARATIVE EXAMPLE

COMPARATIVE EXAMPLE

COMPARATIVE EXAMPLE

COMPARATIVE EXAMPLE

COMPARATIVE EXAMPLE

COMPARATIVE EXAMPLE

CLEANING LIQUID FOR EXCESSIVE POWDER REMOVAL, METHOD FOR PRODUCING THREE-DIMENSIONAL MOLDED OBJECT, AND SET OF OBJECT MOLDING LIQUID AND CLEANING LIQUID

CROSS-REFERENCE TO RELATED APPLICATIONS

This patent application is based on and claims priority pursuant to 35 U.S.C. § 119(a) to Japanese Patent Application No. 2022-039185, filed on Mar. 14, 2022, in the Japan Patent Office, the entire disclosure of which is hereby incorporated by reference herein.

BACKGROUND

Technical Field

The present disclosure relates to a cleaning liquid for excessive powder removal, a method for producing a three-dimensional molded object, and a set of an object molding liquid and a cleaning liquid.

Related Art

Recently, there have been increasing needs for producing complicated, fine molded objects made of metals or the like. As a technique for meeting these needs, from the viewpoint of particularly high productivity, there is a method in which a sintering precursor molded by a binder jetting method is sintered and densified by a powder metallurgy method.

SUMMARY

Embodiments of the present invention provides a cleaning liquid for excessive powder removal containing a hydrocarbon solvent having an octanol/water partition coefficient (log $P_{ow}$ value) of 4.5 or more. The cleaning liquid is to remove excessive powder for molding adhering to a solidified object molded using the powder for molding.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1A:
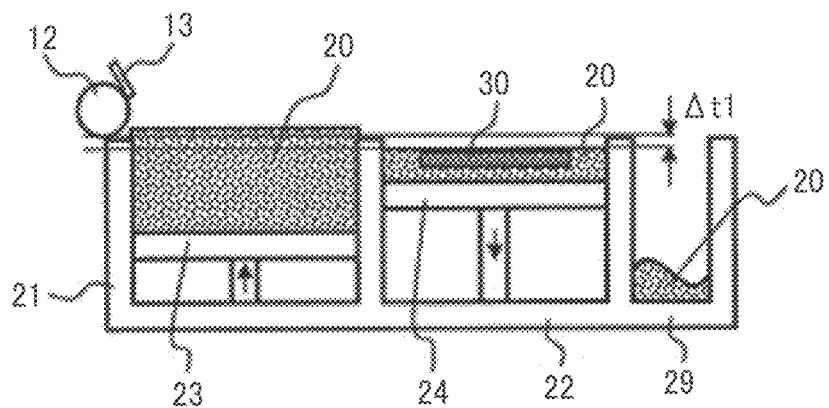
FIG. 1A is a schematic diagram illustrating an example of the operation of an apparatus for producing a three-dimensional molded object.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

According to an embodiment of the present invention, a cleaning liquid for excessive powder removal that can remove an excessive powder while retaining the shape of a solidified object is provided.

Cleaning Liquid for Excessive Powder Removal

A cleaning liquid for excessive powder removal according to an embodiment of the present invention is a cleaning liquid for excessive powder removal used for removing excessive powder for molding adhering to a solidified object molded using the powder for molding. The cleaning liquid for excessive powder removal contains a hydrocarbon solvent having an octanol/water partition coefficient (log $P_{ow}$ value) of 4.5 or more, and further contains other components as necessary.

In the present disclosure, a "powder" may be referred to as a "powder material" or a "powder".

In the present disclosure, an "object molding liquid" may be referred to as a "curing liquid" or a "reaction liquid".

In the present disclosure, a "molded object" means one layer or an assembly (laminate) of a plurality of layers formed by applying an object molding liquid to a powder.

In the present disclosure, a "solidified object" is obtained by solidifying the "molded object", and may be referred to as a "cured object". A solidified object obtained by solidifying a laminated three-dimensional molded object may be referred to as an "unsintered body", a "green body", or a "formed body".

A product obtained by degreasing a "solidified object (unsintered body or the like)" by heat treatment may be referred to as a "degreased body". The "unsintered body" and the "degreased body" may be simply referred to as a "sintering precursor".

A product obtained by sintering the "degreased body" may be referred to as a "sintered body" or a "three-dimensional molded object".

In the present disclosure, an "excessive powder" means a powder adhering to the surface or the like of the unsintered body. The powder means a powder containing a powder for molding.

The "molded object", the "solidified object", the "degreased body", and the "sintered body" each include both a planar structure including only one layer or a three-dimensional structure (laminate) including a plurality of layers.

In a conventional technique, in a resin in a solidified object (unsintered body), a crosslinked portion and a non-crosslinked portion are formed, to control solubility or insolubility of the resin in a cleaning liquid. However, there is a drawback in such a technique that a molded object obtained may be softened due to insufficient reaction of the crosslinked portion.

In a conventional technique, a resin that is easily soluble in an organic solvent (e.g., a polyvinyl acetate-based resin or a polyvinyl butyral-based resin) is used as a binder resin, but there is a drawback in such a technique that the resin is dissolved and the shape of the unsintered body cannot be retained when the resin is immersed in the organic solvent and washed at the time of removing the excessive powder.

As a result of extensive and intensive studies, the inventors of the present invention have found that a "hydrocarbon solvent having an octanol/water partition coefficient (log $P_{ow}$ value) of 4.5 or more" can be used for a cleaning liquid for excessive powder removal for removing an excessive powder of a solidified object (unsintered body, green body) after the application of a binder resin (object molding liquid). In other words, the inventors of the present invention have found that the "hydrocarbon solvent having an octanol/water partition coefficient (log $P_{ow}$ value) of 4.5 or more" can remove only the excessive powder without dissolving the binder resin in the solidified object after the application and solidification of the binder resin (object molding liquid).

The inventors of the present invention have found that the "hydrocarbon solvent having an octanol/water partition coefficient (log $P_{ow}$ value) of 4.5 or more" can be used without any problem for the metal powder used for three-dimensional molding.

For example, a case of using a partially saponified polyvinyl acetate as the resin contained in the object molding liquid will be described. The partially saponified polyvinyl acetate has a high content of hydrophobic vinyl acetate groups in a polymer, and the content of the hydrophobic vinyl acetate groups is 90 mol % or more in the polymer depending on the grade. A resin containing a high concentration of vinyl acetate groups is also dissolved in a hydrocarbon solvent such as benzene or paraffin oil. Since the binder resin contained in the solidified object is as small as about 2% by mass at most, only the slight solution or swelling of the resin causes the solidified object to collapse. For this reason, it is preferable to control the polarity of the cleaning liquid.

The inventors of the present invention have found that a hydrophobic resin is not dissolved by reducing the polarity of the solvent to a non-polar side as much as possible.

From this, the inventors of the present invention have found that when the "octanol/water partition coefficient log $P_{ow}$ value" as an index of polarity (hydrophilicity, hydrophobicity) is 4.5 or more, the shape of the unsintered body can be retained without the resin being dissolved even if the organic solvent is used as the cleaning liquid, or even if a hydrophobic resin such as polyvinyl acetate is used as the binder resin.

Hydrocarbon Solvent

The hydrocarbon solvent has an octanol/water partition coefficient (log $P_{ow}$ value) of 4.5 or more, preferably 5.0 or more, and more preferably 5.0 or more and 8.0 or less.

The hydrocarbon solvent having an octanol/water partition coefficient (log $P_{ow}$ value) of 4.5 or more is not particularly limited, and can be appropriately selected depending on the intended purpose.

Examples of the hydrocarbon solvent having an octanol/water partition coefficient (log $P_{ow}$ value) of 4.5 or more include decane (log $P_{ow}$ value: 5.0), dodecane (log $P_{ow}$ value: 6.1), tetradecane (log $P_{ow}$ value: 7.2), p-menthane (log $P_{ow}$ value: 5.5), undecane (log $P_{ow}$ value: 5.6), tridecane (log $P_{ow}$ value: 6.6), and pentadecane (log $P_{ow}$ value: 7.7).

The octanol/water partition coefficient (log $P_{ow}$ value) represents a ratio of a concentration at which a certain compound is dissolved in an octanol phase to a concentration at which the certain compound is dissolved in water in a two-phase system of octanol and water. The intrinsic octanol/water partition coefficient (log $P_{ow}$ value) of the hydrocarbon solvent can be extracted with reference to a chemical database (PubChem, https://pubchem.ncbi.nlm.nih.gov/). In addition to the chemical database, the octanol/water partition coefficient (log $P_{ow}$ value) may be obtained from values described in the safety data sheet of the hydrocarbon solvent to be used (Safety Data Sheet, SDS).

The hydrocarbon solvent is preferably a hydrocarbon solvent containing no double bond in a molecule. When the hydrocarbon solvent is a hydrocarbon solvent containing no double bond in a molecule, the following phenomenon is effectively prevented: at the time of removing the excessive powder of the solidified object (unsintered body), the binder resin is dissolved and the solidified object (unsintered body) is collapsed due to an excessively low value of the octanol/water partition coefficient (log $P_{ow}$ value).

The hydrocarbon solvent is preferably a hydrocarbon having 7 or more and 15 or less carbon atoms, and more preferably 10 or more and 14 or less carbon atoms. When the hydrocarbon solvent is a hydrocarbon having 7 or more carbon atoms, the octanol/water partition coefficient (log $P_{ow}$ value) increases, and the hydrophobicity of the hydrocarbon solvent increases. In this case, at the time of removing the excessive powder of the solidified object (unsintered body), solution and swelling of the binder resin binding the metal particles are prevented, and collapse of the solidified object (unsintered body) can be effectively prevented. When the hydrocarbon has 15 or less carbon atoms, an increase in a time for drying the cleaning liquid is effectively prevented due to elevation of a boiling point due to an increase in the number of carbon atoms.

The content of the hydrocarbon solvent is not particularly limited as long as the effect in the embodiment of the present invention can be exhibited, and can be appropriately selected depending on the intended purpose. It is preferable that the hydrocarbon solvent does not substantially contain components other than the hydrocarbon solvent. The phrase "does not substantially contain components other than the hydrocarbon solvent" means that the components other than the hydrocarbon solvent are not excluded as long as the effect according to the embodiment of the present invention can be exhibited.

The content of the hydrocarbon solvent is preferably 100% by mass or less with respect to the total amount of the cleaning liquid for excessive powder removal.

Other Components

The other components are not particularly limited, and can be appropriately selected depending on the intended purpose.

The cleaning liquid for excessive powder removal according to an embodiment of the present invention is used for removing an excessive powder of a solidified object obtained by heating the molded object.

Hereinafter, a powder for molding used for producing a solidified object to which a cleaning liquid for excessive powder removal according to an embodiment of the present invention is applied will be described.

Powder for Molding

The powder for molding is not particularly limited as long as the powder for molding is a powder conventionally used in a binder jetting system, and can be appropriately selected depending on the intended purpose. Examples of the powder for molding include a powder containing metal particles.

Metal Particles

The metal particles are particles that are used for producing a three-dimensional molded object and contain a metal as a constituent material.

The constituent material of the metal particles is not particularly limited as long as the constituent material of the metal particles contains a metal. The metal particles may contain a material other than a metal, but the main material of the metal particles is preferably a metal.

When the main material is a metal, the mass of the metal contained in the metal particles is 50.0% by mass or more, preferably 60.0% by mass or more, more preferably 70.0% by mass or more, still more preferably 80.0% by mass or more, and particularly preferably 90.0% by mass or more, with respect to the mass of the metal particles.

Examples of the metal as a constituent material in the metal particles include magnesium (Mg), aluminum (Al), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), lead (Pd), silver (Ag), indium (In), tin (Sn), tantalum (Ta), tungsten (W), neodymium (Nd), and alloys of these metals. Among these metals, steel use stainless (SUS), iron (Fe), copper (Cu), silver (Ag), titanium (Ti), aluminum (Al), and alloys of the metals described above are suitably used.

Examples of the aluminum alloy include $AlSi_{10}Mg$, $AlSi_{12}$, $AlSi_7Mg_{0.6}$, $AlSi_3Mg$, $AlSi_9Cu_3$, Scalmalloy, $ADC_{12}$, and $AlSi_3$. Each of these alloys may be used alone or in combination with others.

The metal particles can be produced using a conventionally known method.

Examples of the method for producing the metal particles include a pulverization method in which a solid is subdivided by applying compression, impact, or friction or the like, an atomization method in which a molten metal is sprayed to obtain a quenched powder, a precipitation method in which a component dissolved in a liquid is precipitated, and a gas phase reaction method in which a component is vaporized and crystallized. Among the methods, the atomization method is preferable from the viewpoint that a spherical shape is obtained with small particle diameter variation.

Examples of the atomization method include a water atomization method, a gas atomization method, a centrifugal atomization method, and a plasma atomization method, and any one of the methods described above is suitably used.

As the metal particles, a commercially available product may be used.

Examples of the commercially available product include pure Al (A1070-30BB available from Toyo Aluminum K. K.), pure Ti (available from OSAKA Titanium technologies Co., Ltd.), SUS316L (trade name: PSS316L available from Sanyo Special Steel Co., Ltd.), $AlSi_{10}Mg$ ($Si_{10}MgBB$ available from Toyo Aluminum K. K.), $SiO_2$ (trade name: EXCELICA SE-15K available from Tokuyama Corporation), $Al_2O_3$ (trade name: TAIMICRON TM-5D available from TAIMEI CHEMICALS CO., LTD.), and $ZrO_2$ (trade name: TZ-B53 available from Tosoh Corporation).

The volume average particle diameter of the metal particles is not particularly limited, and can be appropriately selected depending on the intended purpose. The volume average particle diameter of the metal particles is preferably, for example, 2 µm or more and 100 µm or less, and more preferably 8 µm or more and 50 µm or less. When the volume average particle diameter of the metal particles is 2 µm or more, the aggregation of the metal particles is prevented, which makes it possible to prevent a decrease in the production efficiency of the molded object and deterioration in the handleability of the metal particles. When the average particle diameter of the metal particles is 100 µm or less, it is possible to prevent a decrease in the number of contact points between the metal particles and an increase in voids, and to prevent a decrease in the strength of the molded object.

The particle size distribution of the metal particles is not particularly limited, and can be appropriately selected depending on the intended purpose. A sharper particle size distribution is preferable.

The volume average particle diameter and the particle size distribution of the metal particles can be measured using a known particle diameter measuring device. Examples of the known particle diameter measuring device include a particle diameter distribution measuring device Microtrac MT3000II series (available from MicrotracBel Corporation).

A method for producing a molded object is conventionally known in which a liquid is applied to metal particles comprised of a metal base material and a coating resin coating the base material to cause the coating resin to exert a binder function. In the present disclosure, a resin having a binder function is contained in an object molding liquid.

Therefore, the surfaces of the metal particles may not be coated with a resin.

The use of the metal particles of which surfaces are not coated with the resin makes it possible, for example, to prevent formation of an unintended solidified product in which the metal particles are bound with each other by the coating resin through a solidifying step even if the metal particles are in a powder region to which no liquid is applied (in other words, a non-molding region).

A material with which the metal particles are coated is not limited to the resin, and the surfaces of the metal particles may not be coated with an organic compound such as a surface treatment agent.

The surface treatment agent is not particularly limited, and can be appropriately selected depending on the intended purpose. Examples of the surface treatment agent include a silane coupling agent.

Here, "surfaces are not coated with a resin" means that the ratio of the surface area of the resin or the organic compound to the surface area of the metal particles (surface coating ratio) is less than 15%, for example. The surface coating ratio may be 0%.

The surface coating ratio is determined, for example, by acquiring a photograph of metal particles and measuring the ratio (%) of the area of portions coated with a resin or an organic compound to the total area of the surface of the metal particles in a range acquired in the two-dimensional photograph. In the determination of the portions coated with the resin or the organic compound, for example, a method such as element mapping by energy dispersive X-ray spectroscopy such as SEM-EDS can be used.

Powder Containing Metal Particles

The metal particles are used as a powder that is an aggregate containing a plurality of metal particles, and an object molding liquid is applied to the powder layer to produce a molded object.

In addition to the metal particles, the powder may contain other components as necessary.

Examples of the other components include a filler, a leveling agent, a sintering aid, and polymer resin particles.

The filler is a material effective for adhering to the surfaces of the metal particles or being filled in voids between the metal particles. When the powder contains the filler, for example, the powder has improved fluidity and can include more contact points and less voids between the metal particles. As a result, the strength and dimensional accuracy of a solidified object (unsintered body) can be improved.

The leveling agent is a material effective for controlling the wettability of the surface of a powder layer. By using the leveling agent, for example, the object molding liquid has improved permeability into the powder layer and can improve the strength of the solidified object (unsintered body).

The sintering aid is a material effective for improving the sintering efficiency when a solidified object (unsintered body) is sintered. By using the sintering aid, for example, the strength of the molded object can be improved, the sintering temperature can be lowered, and the sintering time can be shortened.

The polymer resin particles are a material effective for adhering to the surfaces of the metal particles, and are also referred to as an organic external additive.

The average particle diameter of the polymer resin particles is not particularly limited, and is preferably 0.1 µm or more and 10 µm or less, and more preferably 0.1 µm or more and 11 µm or less.

The angle of repose of the powder is preferably 60° or less, more preferably 50° or less, and still more preferably 40° or less. When the angle of repose of the powder is 60° or less, the powder can be efficiently and stably disposed at a desired position on a support.

The angle of repose can be measured using, for example, a powder characteristic measuring apparatus (Powder Tester PT-N type available from Hosokawa Micron Corporation).

Method and Apparatus for Producing Three-Dimensional Molded Object

A method for producing a three-dimensional molded object according to an embodiment of the present invention includes: a powder layer forming step of forming a powder layer containing a powder for molding; an object molding liquid applying step of applying an object molding liquid containing a resin to the powder layer to form a molded object; a solidifying step of solidifying the molded object to obtain a solidified object; and an excessive powder removing step of removing excessive powder for molding adhering to the solidified object with a cleaning liquid containing a hydrocarbon solvent having an octanol/water partition coefficient (log $P_{ow}$ value) of 4.5 or more. The method further includes a laminating step, a sintering step, and other steps as necessary.

An apparatus for producing a three-dimensional molded object in a method for producing a three-dimensional molded object according to an embodiment of the present invention includes: a powder layer forming unit configured to form a powder layer containing a powder for molding; an object molding liquid applying unit configured to apply an object molding liquid containing a resin to the powder layer to form a molded object; a solidifying unit configured to solidify the molded object to obtain a solidified object; a cleaning liquid for removing excessive powder for molding adhering to the solidified object, containing a hydrocarbon solvent having an octanol/water partition coefficient (log $P_{ow}$ value) of 4.5 or more; a cleaning liquid storing container storing the cleaning liquid; and an excessive powder removing unit configured to remove excessive powder for molding adhering to the solidified object with the cleaning liquid. The apparatus further includes other units as necessary.

The inventors of the present invention have extensively conducted studies, and resultantly found that when the resin is contained in the object molding liquid, and the octanol/water partition coefficient (log $P_{ow}$ value) of the cleaning liquid are 4.5 or more, an excessive powder of an unsintered body (green body) after application of a binder resin (object molding liquid) can be removed using a liquid. In other words, the inventors of the present invention have found that when the octanol/water partition coefficient (log $P_{ow}$ value) of the hydrocarbon solvent contained in the cleaning liquid is 4.5 or more, only the excessive powder can be removed without dissolving the binder resin (object molding liquid) in the unsintered body after the application of the binder resin.

The inventors of the present invention have found that when the octanol/water partition coefficient (log $P_{ow}$ value) of the hydrocarbon solvent contained in the cleaning liquid is 4.5 or more, the cleaning liquid can be used without any problem for the metal powder used for three-dimensional molding.

Powder Layer Forming Step and Powder Layer Forming Unit

The powder layer forming step is a step of forming a powder layer containing a powder for molding.

The powder layer forming unit is a unit for forming a powder layer containing a powder for molding.

The powder for molding is similar to the powder for molding described in the cleaning liquid for excessive powder removal according to an embodiment of the present invention.

The powder layer is formed on a support (on a molding stage).

The method for disposing the powder on the support to form a thin layer of the powder (powder layer forming unit) is not particularly limited, and can be appropriately selected depending on the intended purpose. Examples of the method include a method using a known counter rotation mechanism (counter roller) or the like used in a selective laser sintering method described in Japanese Patent No. 3607300, a method for spreading a powder using a member such as a brush, a roller, or a blade, a method for pressing the surface of a powder with a pressing member to spread the powder, and a method using a known additive manufacturing apparatus.

When the powder layer is formed using the powder layer forming unit such as the counter rotation mechanism (counter roller), a brush, a blade, or a pressing member, the powder layer can be formed by, for example, the following method.

That is, a powder is placed using a counter rotation mechanism (counter roller), a brush, a roller, a blade, or a pressing member on a support disposed so as to be movable up and down while sliding against the inner wall of an outer frame (may also be referred to as a "mold", a "hollow cylinder", or a "cylindrical structure" or the like). At this time, when a support movable up and down in the outer frame is used as the support, the support is disposed at a position slightly below the upper end opening of the outer frame (in other words, at a position lower by an amount corresponding to the thickness of one powder layer), and the powder is placed on the support. As described above, a thin layer of the powder can be placed on the support.

The thickness of the powder layer is not particularly limited, and can be appropriately selected depending on the intended purpose. For example, the average thickness per layer is preferably 30 μm or more and 500 μm or less, and more preferably 60 μm or more and 300 μm or less. When the average thickness is 30 μm or more, the strength of a molded object formed by applying an object molding liquid to the powder is improved, which makes it possible to prevent mold collapse and the like that may occur in a subsequent step such as a sintering step. When the average thickness is 500 μm or less, the dimensional accuracy of the molded object derived from the molded object formed by applying the object molding liquid to the powder is improved.

The average thickness is not particularly limited, and can be measured by a known method.

The powder supplied by the powder layer forming unit may be stored in a powder storing unit. The powder storing unit is a member such as a container storing a powder. Examples of the powder storing unit include a storing tank, a bag, a cartridge, and a tank.

Object Molding Liquid Applying Step and Object Molding Liquid Applying Unit

The object molding liquid applying step is a step of applying an object molding liquid containing a resin to the powder layer to form a molded object.

The object molding liquid applying unit is a unit that applies an object molding liquid containing a resin to the powder layer to form a molded object.

Object Molding Liquid

The object molding liquid is a liquid composition that is used for producing a molded object and is applied to a powder layer containing metal particles.

The object molding liquid contains a resin, and further contains an organic solvent, an additive, and other components as necessary.

Resin

The resin is not particularly limited as long as the resin can function as a binder resin that plays a role of bonding individual particles by being applied to a powder in the production of a three-dimensional molded object, and can be appropriately selected depending on the intended purpose.

It is preferable that the resin is soluble in a solvent A, and the solvent A has an octanol/water partition coefficient (log $P_{ow}$ value) of −1.8 or more and 3.4 or less. The solvent A is a solvent different from the hydrocarbon solvent.

Examples of the solvent A having an octanol/water partition coefficient (log $P_{ow}$ value) of −1.8 or more and 3.4 or less include glycerin (log $P_{ow}$ value: −1.8), γ-butyrolactone (log $P_{ow}$ value: −0.6), water (log $P_{ow}$ value: −0.5), 1-butanol (log $P_{ow}$ value: 0.9), 1-hexanol (log $P_{ow}$ value: 2.0), and dipentene (D-limonene) (log $P_{ow}$ value: 3.4).

The octanol/water partition coefficient (log $P_{ow}$ value) represents a ratio of a concentration at which a certain compound is dissolved in an octanol phase to a concentration at which the certain compound is dissolved in water in a two-phase system of octanol and water. The octanol/water partition coefficient (log $P_{ow}$ value) can be extracted with reference to a chemical database (PubChem, https://pubchem.ncbi.nlm.nih.gov/). In addition to the chemical database, for the octanol/water partition coefficient (log $P_{ow}$ value), values described in the safety data sheet (Safety. Data Sheet, SDS) of the solvent to be used may be referred to.

If the resin is a resin soluble in the solvent A, the effect of removing only the excessive powder without dissolving the binder resin in the unsintered body after the application of the binder resin (the resin contained in the object molding liquid) can be improved when the cleaning liquid is used.

Here, an example of the relationship between "the resin is soluble in the solvent A" and "the octanol/water partition coefficient (log $P_{ow}$ value) of the solvent A is −1.8 or more and 3.4 or less" will be described with reference to the following Table 1.

TABLE 1

| | | | Hydrophobic resin Including structural formula (1) | | Water-soluble resin (soluble in some organic solvents) Including structural formula (2) PVP (polyvinyl |
|---|---|---|---|---|---|
| | Resin name | | JMR-10LL | S-LEC BL-10 | pyrrolidone) |
| log$P_{ow}$ of solvent | −1.8 | Glycerin | Bad | Bad | Good |
| | −0.6 | γ-butyrolactone | Good | Good | Good |
| | −0.5 | Water | Bad | Bad | Good |
| | 0.9 | 1-butanol | Good | Good | Bad |
| | 2.0 | 1-hexanol | Good | Poor (presence of turbidity) | Bad |
| | 3.4 | Dipentene (D-limonen) | Good | Bad | Bad |

As illustrated in Table 1, "γ-butyrolactone" having an octanol/water partition coefficient (log$P_{ow}$ value) of "−0.6" can dissolve all of "JMR-10LL (polyvinyl acetate)" and "S-LEC BL-10 (polyvinyl butyral)" which are hydrophobic resins, and "PVP (polyvinyl pyrrolidone)" which is a water-soluble resin.

Meanwhile, for example, in "water" having an octanol/water partition coefficient (log$P_{ow}$ value) of "−0.5", "PVP (polyvinyl pyrrolidone)" which is a water-soluble resin can be dissolved, but "JMR-10LL (polyvinyl acetate)" and "S-LEC BL-10 (polyvinyl butyral)" which are hydrophobic resins cannot be dissolved. "Dipentene (D-limonene)" having an octanol/water partition coefficient (log$P_{ow}$ value) of "3.4" cannot dissolve "PVP (polyvinylpyrrolidone)".

In the present disclosure, "the resin is soluble in the solvent A" means that the resin does not need to have solubility in all solvents belonging to the "octanol/water partition coefficient (log$P_{ow}$ value) of −1.8 or more and 3.4 or less", and is the resin only needs to be soluble in the solvent having the octanol/water partition coefficient within the above range.

The phrase "soluble in the solvent" means that 1 g or more of a resin can be dissolved in 100 g of a solvent at 25° C.

Examples of the resin include a polymer having, as a structural unit, at least one monomer selected from vinyl acetate, allyl alcohol, vinyl alcohol, vinylpyrrolidone, urethane, acrylate, and methacrylate.

Examples of the resin include a resin that can be dissolved or dispersed in other organic solvent, and a resin that can be dissolved or dispersed in an aqueous solvent such as a polyhydric alcohol containing water.

The resin contains, for example, a resin having at least one of a structural unit represented by the following structural formula (1) and a structural unit represented by the following structural formula (2). In the present disclosure, the "structural unit" represents a partial structure in a resin derived from one or more polymerizable compounds.

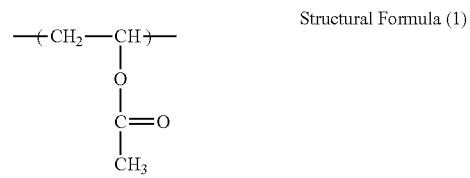

Structural Formula (1)

-continued

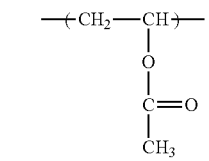

Structural Formula (2)

Resin Having Structural Unit Represented by Structural Formula (1)

The resin having the structural unit represented by the structural formula (1) is disposed in a powder layer containing metal particles by applying an object molding liquid to the powder layer, and functions as a binder that binds the metal particles with each other in a region to which the object molding liquid is applied through an appropriate solidifying step (heat treatment) according to the softening point of the resin, to form a pre-sintering solidified object such as a molded object and an unsintered body derived from the molded object.

Since the pre-sintering solidified object is formed of the resin having the structural unit represented by the structural formula (1) that imparts flexibility, the bending strength of the pre-sintering solidified object is improved.

Since the resin having the structural unit represented by the structural formula (1) is excellent in thermal decomposability, the resin is appropriately removed in the degreasing step, and the density of a sintered body produced through the subsequent sintering step is improved.

Therefore, when metal particles, which are a material assumed being sintered or preferred being sintered, are used as the material for forming the molded object as in the present disclosure, the effect to be obtained is remarkable. Specifically, the resin having the structural unit represented by the structural formula (1) is preferably thermally decomposed by 95% by mass or more, and more preferably thermally decomposed by 97% by mass or more when subjected to temperature elevation from 30° C. to 550° C.

In the present disclosure, "the resin is thermally decomposed" means that the random decomposition of a main chain, or the depolymerization of a molecular chain end, or the like occurs, so that the resin is removed through vaporization, oxidative decomposition, or combustion or the like. Thermal decomposability is measured by using a thermogravimetry-differential thermal analysis system (TG-DTA). Specifically, the ratio of weight reduction between before and after temperature elevation is obtained when the resin is subjected to temperature elevation from 30° C. to 550° C. at a rate of 10° C./min in the atmosphere or a nitrogen atmosphere, and then subjected to temperature retention for 2 hours after the temperature reaches 550° C.

In the resin having the structural unit represented by the structural formula (1), the structural unit represented by the structural formula (1) has hydrophobicity, whereby the solubility of the resin in an organic solvent is improved. Therefore, when the object molding liquid contains the organic solvent, the solubility of the resin having the structural unit represented by the structural formula (1) is improved. This makes it possible to reduce the viscosity of the object molding liquid. The object molding liquid can be appropriately discharged by, for example, an inkjet method. The resin having the structural unit represented by the structural formula (1) is preferably soluble in the organic solvent of the object molding liquid and insoluble in water.

The glass transition temperature (Tg) of the resin having the structural unit represented by the structural formula (1) is preferably 0° C. or higher, more preferably 10° C. or higher, and still more preferably 20° C. or higher. The Tg of the resin having the structural unit represented by the structural formula (1) is preferably 100° C. or lower, more preferably 90° C. or lower, and still more preferably 80° C. or lower.

The softening point of the resin having the structural unit represented by the structural formula (1) is preferably 70° C. or higher, more preferably 80° C. or higher, and still more preferably 90° C. or higher. The softening point of the resin having the structural unit represented by the structural formula (1) is preferably 150° C. or lower, more preferably 140° C. or lower, and still more preferably 130° C. or lower.

The number average molecular weight (Mn) of the resin having the structural unit represented by the structural formula (1) is preferably 5,000 or more and 50,000 or less, and more preferably 10,000 or more and 30,000 or less. When the number average molecular weight (Mn) of the resin having the structural unit represented by the structural formula (1) is within the above range, both improvement in the strength and molding accuracy of the molded object or solidified object, and reduction in the viscosity of the object molding liquid and improvement in the resin concentration in the object molding liquid can be achieved.

The resin having the structural unit represented by the structural formula (1) may be either a resin having a structural unit represented by any other formula than the structural formula (1) or a resin having no structural unit represented by any other formula than the structural formula (1). The structural unit represented by any other formula than the structural formula (1) is preferably, for example, a structural unit represented by the following structural formula (3) or a structural unit represented by the following structural formula (4).

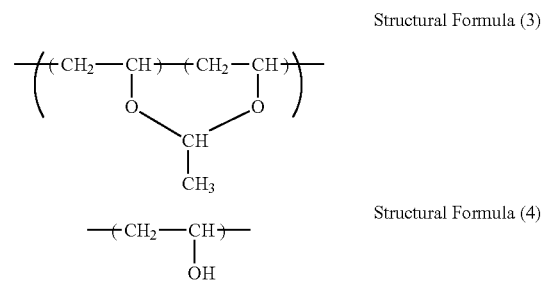

Structural Formula (3)

Structural Formula (4)

The resin having the structural unit represented by the structural formula (3) in addition to the structural unit represented by the structural formula (1) improves the bending strength of a pre-sintering solidified object such as a molded object and an unsintered body derived from the molded object.

Since the structural unit represented by the structural formula (3) also has hydrophobicity like the structural unit represented by the structural formula (1), the solubility of the resin in an organic solvent is improved.

From these viewpoints, in the resin, the total amount of the structural unit represented by the structural formula (1) and the structural unit represented by the structural formula (3) is preferably 60 mol % or more, more preferably 65 mol % or more, still more preferably 70 mol % or more, yet still more preferably 75 mol % or more, and particularly preferably 80 mol % or more, with respect to the total amount of the structural unit represented by the structural formula (1), the structural unit represented by the structural formula (3), and the structural unit represented by the structural formula (4). The same applies when the resin does not have the structural unit represented by the structural formula (3) or the structural formula (4). The ratio may be calculated with the amount of the structural unit not contained in the resin as 0.

In the resin having the structural unit represented by the structural formula (4) in addition to the structural unit represented by the structural formula (1), a hydroxyl group in the structural unit represented by the structural formula (4) improves the affinity with the metal particles in the powder layer to which the object molding liquid is applied. As a result, the bending strength of the pre-sintering solidified object such as a molded object and an unsintered body derived from the molded object is further improved, and the density of the pre-sintering solidified object and the density of a post-sintering solidified object are also further improved. From these viewpoints, in the resin, the amount of the structural unit represented by the structural formula (4) is preferably 5 mol % or more, more preferably 15 mol % or more, and still more preferably 25 mol % or more, with respect to the total amount of the structural unit represented by the structural formula (1), the structural unit represented by the structural formula (3), and the structural unit represented by the structural formula (4).

However, the structural unit represented by the structural formula (4) has hydrophilicity. Therefore, when the ratio of the structural unit represented by the structural formula (4) increases, improvement in the solubility of the resin having the structural unit represented by the structural formula (1) when the object molding liquid contains an organic solvent is suppressed. Accordingly, reduction in the viscosity of the object molding liquid is suppressed. From this viewpoint, in the resin, the amount of the structural unit represented by the structural formula (4) is preferably 40 mol % or less, more preferably 35 mol % or less, still more preferably 30 mol % or less, yet still more preferably 25 mol % or less, and particularly preferably 20 mol % or less, with respect to the total amount of the structural unit represented by the structural formula (1), the structural unit represented by the structural formula (3), and the structural unit represented by the structural formula (4). The same applies to the case where the resin does not have the structural unit represented by the structural formula (3), and the above ratio may be calculated with the amount of the structural unit not contained in the resin as 0.

Specific examples of the resin having the structural unit represented by the structural formula (1) include a polyvinyl acetate resin, a partially saponified polyvinyl acetate resin, and a polyvinyl butyral resin. Among these resins, a polyvinyl acetate resin and a predetermined partially saponified polyvinyl acetate resin are preferable from the viewpoint that the resins can reduce the viscosity of the object molding liquid.

Here, the predetermined partially saponified polyvinyl acetate resin represents a partially saponified polyvinyl acetate resin in which the amount of the structural unit represented by the structural formula (1) is 75 mol % or more, and preferably represents a partially saponified polyvinyl acetate resin in which the amount of the structural unit represented by the structural formula (1) is 80 mol % or more, with respect to the total amount of the structural unit represented by the structural formula (1) and the structural unit represented by the structural formula (4).

These resins may be used alone or two or more of these resins may be used in combination. Commercially available products and synthesized products can both be used.

In the present disclosure, the polyvinyl acetate resin is a resin that has the structural unit represented by the structural formula (1) and does not substantially have the structural unit represented by the structural formula (3) and the structural unit represented by the structural formula (4).

The partially saponified polyvinyl acetate resin is a resin that has the structural unit represented by the structural formula (1) and the structural unit represented by the structural formula (4) and does not substantially have the structural unit represented by the structural formula (3).

The polyvinyl butyral resin is a resin that has the structural unit represented by the structural formula (1) and the structural unit represented by the structural formula (3), or a resin that has the structural unit represented by the structural formula (1), the structural unit represented by the structural formula (3), and the structural unit represented by the structural formula (4).

The partially saponified polyvinyl acetate resin is a resin obtained by partially saponifying a polyvinyl acetate resin.

In the partially saponified polyvinyl acetate resin in the present disclosure, the amount of the structural unit represented by the structural formula (4) is 40 mol % or less, preferably 35 mol % or less, more preferably 30 mol % or less, still more preferably 25 mol % or less, and yet still more preferably 20 mol % or less, with respect to the total amount of the structural unit represented by the structural formula (1) and the structural unit represented by the structural formula (4). In other words, the partially saponified polyvinyl acetate resin in the present disclosure has a degree of saponification of 40 or less, preferably 35 or less, more preferably 30 or less, still more preferably 25 or less, and yet still more preferably 20 or less.

The content of the resin having the structural unit represented by the structural formula (1) is preferably 5.0% by mass or more, more preferably 7.0% by mass or more, still more preferably 10.0% by mass or more, and particularly preferably 11.0% by mass or more, with respect to the mass of the object molding liquid. The content is preferably 30.0% by mass or less, more preferably 25.0% by mass or less, and still more preferably 20.0% by mass or less. When the content is 5.0% by mass or more, the bending strength of a pre-sintering solidified object such as a molded object and an unsintered body derived from the molded object is further improved. When the content is 30.0% by mass or less, the viscosity of the object molding liquid is further reduced. The object molding liquid can be appropriately discharged by, for example, an inkjet method.

The resin in which the total amount of the structural unit represented by the structural formula (1) and the structural unit represented by the structural formula (3) is 95 mol % or more with respect to the total amount of the structural unit represented by the structural formula (1), the structural unit represented by the structural formula (3), and the structural unit represented by the structural formula (4) has improved solubility in an organic solvent and lowers the viscosity of the object molding liquid. Therefore, it is also possible to add the resin in the object molding liquid in a high mass (e.g., 15.0% by mass or more or 20.0% by mass or more with respect to the mass of the object molding liquid). This further improves the bending strength of a pre-sintering solidified object such as a molded object and an unsintered body derived from the molded object.

The amount (mol %) of the structural unit represented by each structural formula in the resin can be determined, for example, by the polyvinyl alcohol test method described in JIS-K6276-1994.

Resin Having Structural Unit Represented by Structural Formula (2)

The resin having the structural unit represented by the structural formula (2) is disposed in a powder layer containing metal particles by applying the object molding liquid to the powder layer, and functions as a binder that binds the metal particles with each other in a region to which the object molding liquid is applied through an appropriate solidifying step according to the softening point of the resin, to form a pre-sintering solidified object such as a molded object and an unsintered body derived from the molded object.

Since the pre-sintering molded object is formed of a resin having the structural unit represented by the structural formula (2) having a five-membered-ring lactam structure having high affinity with a metal, the metal particles are firmly bound to each other, and the bending strength of the pre-sintering molded object is improved.

The resin having the structural unit represented by the structural formula (2) is excellent in thermal decomposability when the temperature elevation profile is appropriately controlled. Therefore, the resin having the structural unit represented by the structural formula (2) is appropriately removed in the degreasing step, and the density of a sintered body produced through the subsequent sintering step is improved.

Therefore, when metal particles, which are a material assumed being sintered or preferred being sintered, are used as the material for forming a molded object as in the present disclosure, the effect to be obtained is remarkable. Specifically, the resin having the structural unit represented by the structural formula (2) is preferably thermally decomposed by 95% by mass or more, and more preferably thermally decomposed by 97% by mass or more when subjected to temperature elevation from 30° C. to 550° C.

However, the resin having the structural unit represented by the structural formula (2) forms a crosslinked structure depending on temperature conditions (e.g., heating conditions at 160° C. or higher), which may suppress the effect of high thermal decomposability. Therefore, when metal particles, which are a material assumed being sintered or preferred being sintered, are used as the material for forming a molded object as in the present disclosure, the use of the resin having the structural unit represented by the structural formula (1) may be preferred to the use of the resin having the structural unit represented by the structural formula (2) from the viewpoint of easy handleability.

Furthermore, since the resin having the structural unit represented by the structural formula (2) has a five-membered-ring lactam structure, the resin having the structural unit represented by the structural formula (2) has improved solubility in a specific organic solvent (mainly, a polar solvent). This makes it possible to reduce the viscosity of the object molding liquid. The object molding liquid can be appropriately discharged by, for example, an inkjet method. When the resin having the structural unit represented by the structural formula (2) is used in combination with a component 1 (cyclic esters (lactones) and the like) and a component 2 (glycol diethers) and the like described below, as organic solvents, the viscosity of the object molding liquid can be further reduced. As described above, since the viscosity of the object molding liquid can be reduced, the resin having the structural unit represented by the structural formula (2) can also be contained in a high mass in the object molding liquid (e.g., 15.0% by mass or more with respect to the mass of the object molding liquid.). This further improves the bending strength of a pre-sintering solidified object such as a molded object and an unsintered body derived from the molded object.

The softening point of the resin having the structural unit represented by the structural formula (2) is preferably 70° C. or higher, more preferably 80° C. or higher, and still more preferably 90° C. or higher. The softening point is preferably 180° C. or lower, more preferably 170° C. or lower, and still more preferably 160° C. or lower.

The number average molecular weight (Mn) of the resin having the structural unit represented by the structural formula (2) is preferably 3,000 or more and 50,000 or less, and more preferably 5,000 or more and 40,000 or less. When the number average molecular weight (Mn) is within the above range, it is possible to achieve both improvement in strength and molding accuracy, and reduction in the viscosity of the object molding liquid and improvement in the resin concentration in the object molding liquid.

Specific examples of the resin having the structural unit represented by the structural formula (2) include a polyvinylpyrrolidone resin. Commercially available products and synthesized products can both be used.

The content of the resin having the structural unit represented by the structural formula (2) is preferably 7.0% by mass or more, more preferably 10.0% by mass or more, still more preferably 11.0% by mass or more, and particularly preferably 13.0% by mass or more, with respect to the mass of the object molding liquid. The content of the resin having the structural unit represented by the structural formula (2) is preferably 25.0% by mass or less, more preferably 20.0% by mass or less, and still more preferably 15.0% by mass or less. When the content of the resin having the structural unit represented by the structural formula (2) is 7.0% by mass or more, the bending strength of a pre-sintering solidified object such as a molded object and an unsintered body derived from the molded object is further improved. When the content of the resin having the structural unit represented by the structural formula (2) is 25.0% by mass or less, the viscosity of the object molding liquid is further reduced, and the object molding liquid can be appropriately discharged by, for example, an inkjet method.

Organic Solvent

The object molding liquid contains an organic solvent.

The organic solvent is a liquid component used to bring the object molding liquid into a liquid state at normal temperature.

The object molding liquid is preferably a nonaqueous object molding liquid by containing an organic solvent.

In the present disclosure, the "nonaqueous object molding liquid" refers to an object molding liquid that contains an organic solvent as a liquid component of the object molding liquid and in which a component that has the maximum mass among liquid components is an organic solvent. In the "nonaqueous object molding liquid", the content of the organic solvent with respect to the content of the liquid component in the object molding liquid is preferably 90.0% by mass or more, and more preferably 95.0% by mass or more.

This is because in the case of the nonaqueous object molding liquid, the solubility of the resin having the structural unit represented by the structural formula (1) is particularly improved, and the viscosity of the object molding liquid is reduced.

The nonaqueous object molding liquid may be rephrased as, for example, an object molding liquid that does not substantially contain water. Thus, even if the material constituting the metal particles is a highly active metal, in other words, a water-reactive material (e.g., aluminum, zinc, and magnesium and the like), the object molding liquid can be applied to the material. As an example, aluminum forms a coating film formed of aluminum hydroxide when aluminum is in contact with water, leading to a problem that the sintering density of a sintered body is low when the content of water in the object molding liquid is high. This problem is prevented by using an object molding liquid that does not contain water. As another example, aluminum has a problem that the handling of aluminum is difficult since aluminum generates hydrogen when aluminum is in contact with water, but this problem is also suppressed by using an object molding liquid that does not contain water.

Examples of the organic solvent include n-octane, m-xylene, solvent naphtha, diisobutyl ketone, 3-heptanone, 2-octanone, acetyl acetone, butyl acetate, amyl acetate, n-hexyl acetate, n-octyl acetate, ethyl butyrate, ethyl valerate, ethyl caprylate, ethyl octanoate, ethyl acetoacetate, ethyl 3-ethoxypropionate, diethyl oxalate, diethyl malonate, diethyl succinate, diethyl adipate, bis 2-ethylhexyl maleate, triacetin, tributyrin, propylene glycol monomethyl ether acetate, ethylene glycol monobutyl ether acetate, dibutyl ether, 1,2-dimethoxybenzene, 1,4-dimethoxybenzene, diethylene glycol monobutyl ether, diethylene glycol dimethyl ether, triethylene glycol dimethyl ether, 2-methoxy-1-methylethyl acetate, γ-butyrolactone, propylene carbonate, cyclohexanone, and butyl cellosolve. One of these organic solvents may be used alone or two or more of these organic solvents may be used in combination.

When the resin having the structural unit represented by the structural formula (1) is used, the organic solvent to be used in combination is not particularly limited. It is preferable to use an organic solvent having at least one structure selected from the group consisting of an alkoxy group, an ether bond, and an ester bond. It is more preferable to use an organic solvent having an ether bond. It is particularly preferable to use alkylene glycol dialkyl ethers. When these organic solvents are used, the solubility of the resin having the structural unit represented by the structural formula (1) is further improved. This makes it possible to further reduce the viscosity of the object molding liquid. The object molding liquid can be appropriately discharged by, for example, an inkjet method.

In the present disclosure, the "alkylene glycol dialkyl ethers" are represented by $R_1$—(O—$R_2$)m-$OR_3$, where $R_1$ and $R_3$ are each independently an alkyl group having 1 or more but 5 or less carbon atoms, may be straight-chained or branched, and preferably have 1 or 2 carbon atoms. $R_2$ is an alkylene group having 2 or more and 5 or less carbon atoms, may be straight-chained or branched, and more preferably has 2 or 3 carbon atoms. m represents an integer of 1 or more and 5 or less, and more preferably 2 or 3.

Specific examples of the alkylene glycol dialkyl ethers include diethylene glycol dimethyl ether, triethylene glycol dimethyl ether, diethylene glycol ethyl methyl ether, and diethylene glycol butyl methyl ether. Among these alkylene glycol dialkyl ethers, diethylene glycol dimethyl ether and triethylene glycol dimethyl ether are preferable, and triethylene glycol dimethyl ether is more preferable.

When the resin having the structural unit represented by the structural formula (2) is used, the organic solvent to be used in combination is preferably a polar solvent. Specifically, it is preferable to use at least one selected from components 1 that are the group consisting of cyclic esters (lactones), cyclic ketones, and alkylene glycol monoalkyl ethers. It is more preferable to further use at least one selected from components 2 that are the group consisting of alkylene glycol dialkyl ethers in addition to the at least one selected from the components 1. When these organic solvents are used, the solubility of the resin having the structural unit represented by the structural formula (2) is further improved. This makes it possible to further reduce the viscosity of the object molding liquid. The object molding liquid can be appropriately discharged by, for example, an inkjet method. From the viewpoint of further improving the solubility of the resin having the structural unit represented by the structural formula (2), the components 1 are preferably the group consisting of cyclic esters (lactones) and cyclic ketones.

When the resin having the structural unit represented by the structural formula (2) is used, and both at least one selected from the components 1 and at least one selected from the components 2 are used as the organic solvents, the mass ratio of the total amount of the components 1 to the total amount of the components 2 (components 1/components 2) is preferably 60/40 to 100/0. When the mass ratio of the total amount of the components 1 to the total amount of the components 2 is 60/40 to 100/0, the solubility of the resin having the structural unit represented by the structural formula (2) is further improved. This makes it possible to further reduce the viscosity of the object molding liquid.

Specific examples of the components 1 that are the group consisting of cyclic esters (lactones), cyclic ketones, and alkylene glycol monoalkyl ethers include γ-butyrolactone, propylene carbonate, and cyclohexanone.

Specific examples of the components 2 that are the group consisting of alkylene glycol dialkyl ethers include diethylene glycol dimethyl ether, triethylene glycol dimethyl ether, diethylene glycol ethyl methyl ether, and diethylene glycol butyl methyl ether. Among these components 2, diethylene glycol dimethyl ether and triethylene glycol dimethyl ether are preferable.

In the present disclosure, the "alkylene glycol monoalkyl ethers" are represented by $R_4$—(O—$R_5$)n-OH where $R_4$ is an alkyl group having 1 or more and 5 or less carbon atoms, and may be straight-chained or branched. $R_5$ is an alkylene group having 2 or more and 5 or less carbon atoms, and may be straight-chained or branched. n represents an integer of 1 or more and 5 or less.

When it is desired to further reduce the viscosity of the object molding liquid, the kind of the organic solvent to be used in combination with the resin is more influential to use of the resin having the structural unit represented by the structural formula (2) than to use of the resin having the structural unit represented by the structural formula (1), and thus there is a need for the selective use of the organic solvents (components 1 and components 2) as described above. Therefore, the use of the resin having the structural unit represented by the structural formula (1) is preferred to the use of the resin having the structural unit represented by the structural formula (2) from the viewpoint that the materials for producing the object molding liquid can be selected from a wide range.

The content of the organic solvent is preferably 60.0% by mass or more and 95.0% by mass or less, and more preferably 70.0% by mass or more and 95.0% by mass or less, with respect to the mass of the object molding liquid. When the content of the organic solvent is 60.0% by mass or more and 95.0% by mass or less, the solubility of the resin is further improved. This makes it possible to further reduce the viscosity of the object molding liquid. The object molding liquid can be appropriately discharged by, for example, an inkjet method. The object molding liquid is suppressed from drying in an object molding liquid applying unit, and is excellent in discharging stability.

The mass ratio of the amount of the organic solvent to the amount of the resin (organic solvent/resin) is preferably 75/25 or more and 95/5 or less. When the mass ratio of the amount of the organic solvent to the amount of the resin is 75/25 or more, the solubility of the resin is further improved. This makes it possible to further reduce the viscosity of the object molding liquid. The object molding liquid can be appropriately discharged by, for example, an inkjet method. When the mass ratio of the amount of the organic solvent to the amount of the resin is 95/5 or less, the bending strength of a pre-sintering solidified object such as a molded object and an unsintered body derived from the molded object is further improved.

The total amount of the amount of the organic solvent and the amount of the resin is preferably 90.0% by mass or more, more preferably 95.0% by mass or more, still more preferably 99.0% by mass or more, and yet still more preferably 99.5% by mass or more, with respect to the mass of the object molding liquid.

The object molding liquid may not substantially contain components other than the organic solvent and the resin.

"The object molding liquid does not substantially contain components other than the organic solvent and the resin"

means that the object molding liquid is produced without actively using the components other than the organic solvent and the resin as materials, or the content of the components other than the organic solvent and the resin in the object molding liquid is equal to or less than the detection limit when a known method of common technical knowledge is used.

When the total amount of the amount of the organic solvent and the amount of the resin is 90.0% by mass or more with respect to the mass of the object molding liquid, the content of the resin contained in the object molding liquid is high, and the bending strength of a pre-sintering solidified object such as a molded object and an unsintered body derived from the molded object is further improved. When the content of the components other than the organic solvent and the resin (e.g., non-soluble materials in the object molding liquid such as metal fine particles) is low or substantially eliminated, the viscosity of the object molding liquid is reduced, and the discharging stability and storage stability of the object molding liquid are improved.

The viscosity of the organic solvent is preferably low. Specifically, the viscosity of the organic solvent is preferably 5.0 mPa·s or more and 50.0 mPa·s or less, and preferably 8.0 mPa·s or more and 30.0 mPa·s or less at 25° C. When the viscosity of the organic solvent is within the above range, the viscosity of the object molding liquid containing the organic solvent is also likely to be low. This stabilizes the discharging of the object molding liquid from an object molding liquid applying unit such as an inkjet head. The accurate discharging of the object molding liquid further improves the bending strength and also the dimensional accuracy of a pre-sintering solidified object such as a molded object and an unsintered body derived from the molded object.

The viscosity can be measured in accordance with, for example, JIS K7117.

The boiling point of the organic solvent is preferably high. Specifically, the boiling point of the organic solvent is preferably 150° C. or higher, and more preferably 180° C. or higher. This is because when the boiling point of the organic solvent is high when the object molding liquid is discharged by an inkjet method or the like, the drying of the object molding liquid in a nozzle or near the nozzle is suppressed, which makes it possible to suppress the occurrence of nozzle clogging due to the precipitating resin. The organic solvent having a high boiling point is not particularly limited. Examples of the organic solvent having a high boiling point include γ-butyrolactone (boiling point: 204° C.), propylene carbonate (boiling point: 242° C.), cyclohexanone (boiling point: 155.6° C.), diethylene glycol dimethyl ether (boiling point: 162° C.), and triethylene glycol dimethyl ether (boiling point: 216° C.) described above.

Additives

The object molding liquid may appropriately contain a surfactant, an anti-drying agent, a viscosity modifier, a penetrant, an antifoaming agent, a pH modifier, an antiseptic, an antifungal agent, a colorant, a preservative, and a stabilizer and the like depending on the intended purpose. These conventionally known materials can be used as these additives.

Other Components

Water

In the object molding liquid, water is not substantially contained.

In the present disclosure, "water is not substantially contained" means that the content of water is 10.0% by mass or less with respect to the mass of the object molding liquid.

The content of water is preferably 5.0% by mass or less, more preferably 3.0% by mass or less, and still more preferably 1.0% by mass or less. It is particularly preferable that the object molding liquid does not contain water.

When the object molding liquid does not substantially contain water, the solubility of the resin is further improved. This makes it possible to further reduce the viscosity of the object molding liquid.

The formation of hydrogels containing a plenty of water around the resin is suppressed. This suppresses an increase in the viscosity of the object molding liquid. Thus, the object molding liquid can be appropriately discharged by, for example, an inkjet method.

In the present disclosure, "the object molding liquid does not contain water" means that an object molding liquid is produced without actively using water as a material, or the content of the water in the object molding liquid is equal to or less than the detection limit when a known method of common technical knowledge is used.

When the object molding liquid does not substantially contain water, the object molding liquid can be applied to the material constituting the metal particles even if the material is a highly active metal, in other words, a water-reactive material (e.g., aluminum, zinc, and magnesium and the like). As an example, aluminum forms a coating film formed of aluminum hydroxide when aluminum is in contact with water, leading to a problem that the sintering density of a sintered body is low when the content of water in the object molding liquid is high. This problem is suppressed by using an object molding liquid that does not contain water. As another example, aluminum has a problem that the handling of aluminum is difficult since aluminum generates hydrogen when aluminum is in contact with water, but this problem is also suppressed by using an object molding liquid that does not contain water.

The object molding liquid applying unit is not particularly limited, and can be appropriately selected depending on the intended purpose. Examples of the object molding liquid applying unit include a dispenser method, a spray method, and an inkjet method. Among these methods, the dispenser method is excellent in liquid droplet quantitativity, but has a small coating area. The spray method can easily form a fine discharged object, has a large coating area, and is excellent in coatability, but has poor liquid droplet quantitativity and has scattering of the object molding liquid due to a spray current. For this reason, the inkjet method is preferable. The inkjet method is preferable in that the inkjet method has liquid droplet quantitativity better than the liquid droplet quantitativity of the spray method, can advantageously have a coating area larger than the coating area of the dispenser method, and can accurately and efficiently form a complicated molded object.

When the inkjet method is used, the object molding liquid applying unit configured to apply the object molding liquid by discharging the object molding liquid is an inkjet head including a nozzle through which the object molding liquid is discharged. As the inkjet head, an inkjet head of a known inkjet printer can be suitably used. Examples of the inkjet head of the inkjet printer include industrial inkjet RICOH MH/GH SERIES available from Ricoh Company, Ltd. Examples of the inkjet printer include SG7100 available from Ricoh Company, Ltd.

The object molding liquid supplied to the object molding liquid applying unit may be stored in an object molding liquid storing unit. The object molding liquid storing unit is a member such as a container in which the object molding liquid is stored. Examples of the object molding liquid storing unit include a storing tank, a bag, a cartridge, and a tank.

Laminating Step

The method for producing a three-dimensional molded object according to an embodiment of the present invention may include a laminating step of forming a laminate by sequentially repeating a powder layer forming step and an object molding liquid applying step.

The "laminate" is a structure in which a plurality of powder layers each having a region to which the object molding liquid is applied is laminated.

At this time, the structure may not internally include a three-dimensional object retained in a certain three-dimensional shape, or may internally include a three-dimensional object retained in a certain three-dimensional shape.

The laminating step includes a step of placing a powder in the form of a thin layer (powder layer forming step), and a step of applying the object molding liquid onto the thin layer (object molding liquid applying step), and forms a region to which the object molding liquid is applied in the powder layer through these steps.

The laminating step further includes a step of placing (laminating) the powder in the form of a thin layer in the same manner as described above on the thin layer, which is the powder layer including the region to which the object molding liquid is applied (powder layer forming step), and a step of applying the object molding liquid onto the thin layer (object molding liquid applying step), and forms a region to which the object molding liquid is applied in the newly laminated powder layer through these steps.

At this time, the region to which the object molding liquid is applied in the topmost laminated thin layer of the powder is continuous from the region to which the object molding liquid is applied in the underlying thin layer of the powder. As a result, an object molding liquid-applied region having the thickness of two layers of the powder is obtained.

Solidifying Step and Solidifying Unit

The solidifying step is a step of solidifying the molded object to obtain a solidified object.

The solidifying unit is a unit for solidifying the molded object to obtain a solidified object.

The "solidified" means that a certain shape is retained.

The "solidified object" is a structure including a three-dimensional object retained in a certain three-dimensional shape.

The solidified object represents an object that has not been subjected to an excessive powder removing step of removing an excessive powder as a powder not constituting the three-dimensional object.

The method for solidifying the molded object is not particularly limited. Examples of the method include heating.

A heating temperature in the solidifying step is preferably higher than the softening point Sp (° C.) of the resin, and more preferably Sp (° C.) or higher and Sp+150 (° C.) or lower.

Thus, the resin can function as a binder that binds the metal particles with each other in the region to which the object molding liquid is applied, to form a pre-sintering solidified object such as a molded object and an unsintered body derived from the molded object.

The solidifying unit is not particularly limited. Examples of the solidifying unit include a drying device and a thermo-hygrostat.

Excessive Powder Removing Step and Excessive Powder Removing Unit

The excessive powder removing step is a step of removing the powder for molding adhering to the solidified object with a cleaning liquid containing a hydrocarbon solvent having an octanol/water partition coefficient (log $P_{ow}$ value) of 4.5 or more.

The excessive powder removing unit is unit for removing the powder for molding adhering to the solidified object with a cleaning liquid containing a hydrocarbon solvent having an octanol/water partition coefficient (log $P_{ow}$ value) of 4.5 or more.

The excessive powder removing step is a step of removing an excessive powder, which is the powder adhering to the solidified object, to obtain an unsintered body.

The "unsintered body" refers to a three-dimensional object that is retained in a certain three-dimensional shape and has undergone the excessive powder removing step of removing an excessive powder, which is a powder not constituting the solidified object. The unsintered body preferably refers to a three-dimensional object to which no excessive powder substantially adheres. The "unsintered body" may be referred to as a "green body".

In the excessive powder removing step, the method for "removing the powder for molding adhering to the solidified object with the cleaning liquid" is not particularly limited as long as the excessive powder for molding adhering to the solidified object can be removed using the cleaning liquid, and can be appropriately selected depending on the intended purpose. Suitable examples of the method include a method for immersing the solidified object in the cleaning liquid to remove the powder for molding adhering to the solidified object by ultrasonic treatment.

In the excessive powder removing step, for example, a step of removing the excessive powder from the surface of the solidified object by air blowing is preferably combined in addition to the "removing the powder for molding adhering to the solidified object with the cleaning liquid".

The solidified object obtained through the solidifying step is in a state of being buried in an excessive powder which is the powder to which the object molding liquid is not applied. When the solidified object is taken out from the buried state, the excessive powder adheres to the surface or the interior of the solidified object, which makes it difficult to easily remove the excessive powder.

When the surface shape of the solidified object is complicated or the internal structure of the solidified object is like a flow path, it is more difficult to remove the excessive powder.

Since a pre-sintering solidified object molded by a general binder jetting method does not have high strength, the solidified object may collapse when the pressure of air blowing by a wind sending unit is high.

Meanwhile, since the solidified object formed using the object molding liquid of the present disclosure is formed of the resin, the bending strength of the solidified object is improved, and the solidified object has strength that can endure the pressure of air blowing. At this time, the strength of the solidified object expressed by a three-point bending stress is preferably 3 MPa or more, and more preferably 5 MPa or more.

In the method and apparatus for producing a three-dimensional molded object according to an embodiment of the present invention, the octanol/water partition coefficient (log $P_{ow}$ value) of the cleaning liquid is 4.5 or more, preferably 5.0 or more, and more preferably 5.0 or more and 8.0 or less. When the "hydrocarbon solvent has an octanol/ water partition coefficient (log $P_{ow}$ value) of 4.5 or more", only the excessive powder can be removed without dissolving the binder resin (object molding liquid) in the unsintered body after the application of the binder resin.

In the method and apparatus for producing a three-dimensional molded object according to an embodiment of the present invention, the cleaning liquid is preferably the cleaning liquid for excessive powder removal according to an embodiment of the present invention.

Other Steps and Other Units

The other steps are not particularly limited, and can be appropriately selected depending on the intended purpose. Examples of the other steps include a drying step, a degreasing step, a sintering step, and a post-treatment step.

The other units are not particularly limited, and can be appropriately selected depending on the intended purpose. Examples of the other units include a drying unit, a degreasing unit, a sintering unit, and a post-treatment unit.

Drying Step and Drying Unit

The method for producing a three-dimensional molded object according to an embodiment of the present invention preferably includes a drying step of drying the unsintered body to remove a liquid component such as a cleaning liquid remaining in the unsintered body.

In the drying step, not only the liquid component such as a cleaning liquid contained in the unsintered body, but also an organic substance may be removed.

As the drying unit, for example, a known drying device and a known thermo-humidistat and the like can be used.

Degreasing Step and Degreasing Unit

The method for producing a three-dimensional molded object according to an embodiment of the present invention preferably includes a degreasing step of heating the unsintered body to remove a resin and the like derived from the applied object molding liquid, thereby obtaining a degreased body.

The "degreased body" is a three-dimensional object obtained by degreasing an organic component such as the resin from the unsintered body.

In the degreasing step, an organic component such as the resin is decomposed and removed by heating the unsintered body at a temperature equal to or higher than the thermal decomposition temperature of the organic component and lower than the melting point or solidus temperature (e.g., when particles of $AlSi_{10}Mg$ are used, the temperature is about 570° C.) of the material (metal) constituting the metal particles for a predetermined time (e.g., 1 to 10 hours) using a degreasing unit.

Examples of the degreasing unit include a known sintering furnace and a known electric furnace.

Sintering Step and Sintering Unit

The method for producing a three-dimensional molded object according to an embodiment of the present invention preferably includes a sintering step of heating the solidified object (unsintered body) or the degreased body to obtain a sintered body. A "sintered body" is a three-dimensional object formed by integrating the metal material constituting the metal particles, and is molded by sintering the solidified object (unsintered body) or the degreased body.

In the sintering step, the metal material constituting the metal particles is integrated by heating the degreased body at a temperature equal to or higher than the solidus temperature (e.g., when particles of $AlSi_{10}Mg$ are used, the temperature is about 570° C.) of the metal material constituting the metal particles and equal to or lower than the liquidus temperature (e.g., when particles of $AlSi_{10}Mg$ are used, the temperature is about 600° C.) for a predetermined time (e.g., 1 to 10 hours) using a sintering unit.

Examples of the sintering unit include a known sintering furnace. The sintering unit may be the same unit as the degreasing unit described above. The degreasing step and the sintering step may be continuously performed.

Post-Treatment Step and Post-Treatment Unit

The method for producing a three-dimensional molded object according to an embodiment of the present invention preferably includes a post-treatment step of subjecting the sintered body to post-treatment.

The post-treatment step is not particularly limited, and can be appropriately selected depending on the intended purpose. Examples of the post-treatment step include a surface protection treatment step and a painting step.

The post-treatment unit is not particularly limited, and can be appropriately selected depending on the intended purpose. Examples of the post-treatment unit include a surface protection treatment unit and a painting unit.

Object Molding Flow

The object molding flow of the method for producing a three-dimensional molded object of the present disclosure will be described with reference to FIGS. 1A to 1E. FIG. 1A to 1E are schematic views illustrating an example of the operation of an apparatus for producing a three-dimensional molded object.

First, the description will be started from a state where a first powder layer 30 has been formed on an object molding stage of an object molding tank. When the next powder layer is formed on the first powder layer 30, a supplying stage 23 of a supplying tank is moved upward, and an object molding stage 24 of the object molding tank is moved downward as illustrated in FIG. 1A. At this time, the distance by which the object molding stage 24 is moved downward is set such that the interval (lamination pitch) between the upper surface of the powder layer in the object molding tank 22 and the lower portion (lower tangential portion) of a flattening roller 12 is Δt1. The interval Δt1 is not particularly limited, and is preferably about several tens to 100 μm.

In the present disclosure, the flattening roller 12 is disposed in a manner to have a gap from the upper end surfaces of the supplying tank 21 and the object molding tank 22. Therefore, when the powder 20 is conveyed and supplied into the object molding tank 22 and flattened, the upper surface of the powder layer is at a position higher than the upper end surfaces of the supplying tank 21 and the object molding tank 22. This makes it possible to reliably prevent the flattening roller 12 from contacting the upper end surfaces of the supplying tank 21 and the object molding tank 22 and to reduce the damage of the flattening roller 12. When the surface of the flattening roller 12 is damaged, the flattening roller 12 tends to generate streaks in the surface of a powder layer 31 (see FIG. 1D) supplied into the object molding tank 22 and reduce the flatness of the layer.

Figure 1B:
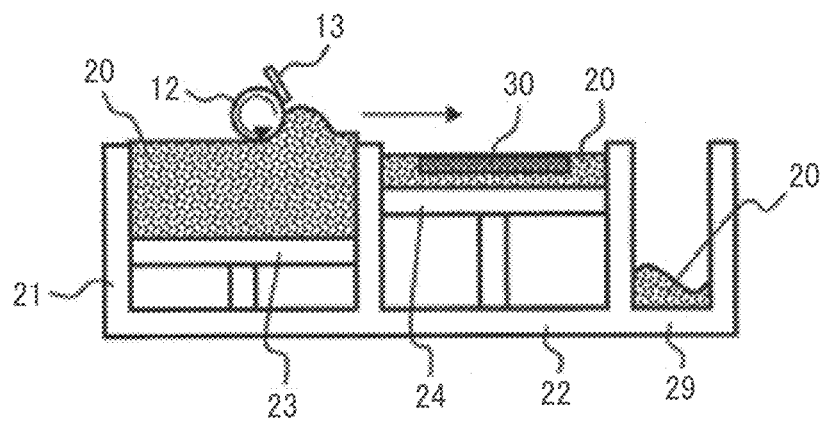
FIG. 1B is a schematic diagram illustrating another example of the operation of the apparatus for producing a three-dimensional molded object.
Figure 1C:
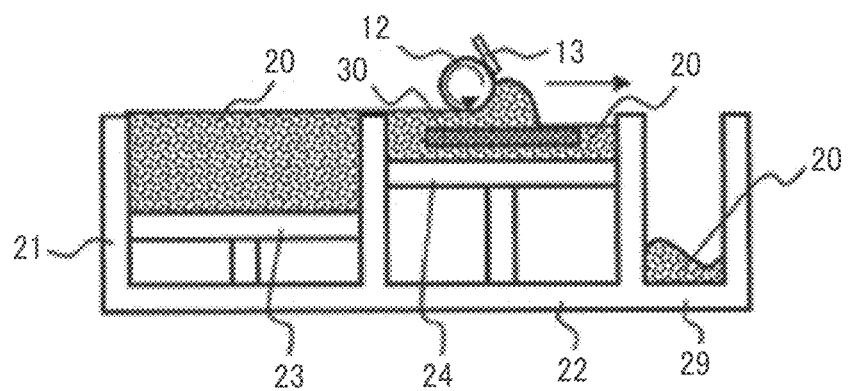
FIG. 1C is a schematic diagram illustrating another example of the operation of the apparatus for producing a three-dimensional molded object.
Figure 1D:
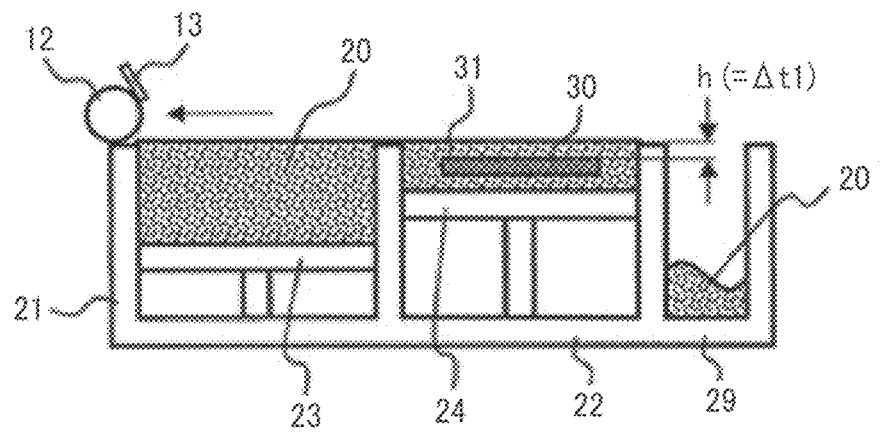
FIG. 1D is a schematic diagram illustrating another example of the operation of the apparatus for producing a three-dimensional molded object.

Next, as illustrated in FIG. 1B, the powder 20 disposed at a position higher than the upper end surface of the supplying tank 21 is caused to move to the object molding tank 22 side while the flattening roller 12 is rotated in the direction of an arrow, to convey and supply the powder 20 into the object molding tank 22 (powder supplying). Furthermore, as illustrated in FIG. 1C, the flattening roller 12 is caused to move in parallel with the stage surface of the object molding stage 24 of the object molding tank 22, to form a powder layer 31 having a predetermined thickness Δt1 on the object molding stage 24 of the object molding tank 22 (flattening). At this time, any excessive powder 20 left unused for forming the powder layer 31 falls into an excessive powder receiving tank 29. After the powder layer 31 is formed, the flattening roller 12 is caused to move to the supplying tank 21 side and returned to the initial position (origin position) as illustrated in FIG. 1D.

Here, the flattening roller 12 can move while retaining a constant distance from the upper end surfaces of the object molding tank 22 and the supplying tank 21. Since the flattening roller 12 can move while retaining a constant distance, the flattening roller 12 can form a powder layer 31 having a uniform thickness h (corresponding to the lamination pitch Δt1) on the object molding tank 22 or on an already formed solidified layer 30 while conveying the powder 20 onto the object molding tank 22. Hereinafter, the thickness h of the powder layer 31 and the lamination pitch Δt1 may be described without distinction, but mean the same thickness and the same meaning unless otherwise particularly specified. The thickness h of the powder layer 31 may be obtained by actual measurement. In this case, an average value obtained from a plurality of positions is preferable.

Figure 1E:
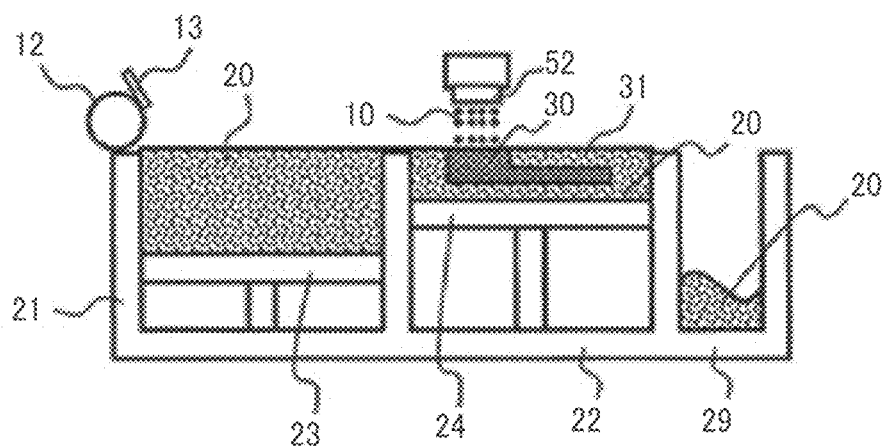
FIG. 1E is a schematic diagram illustrating another example of the operation of the apparatus for producing a three-dimensional molded object.

Thereafter, as illustrated in FIG. 1E, liquid droplets 10 of the object molding liquid are discharged from a head 52 of a liquid discharging unit to laminate and form an object molding liquid applied layer 30 having a desired shape on the next powder layer 31. Next, the powder layer forming step and the object molding liquid applying step described above are repeated, to newly form and laminate an object molding liquid applied layer 30. At this time, the new object molding liquid applied layer 30 and the underlying object molding liquid applied layer 30 are integrated with each other. Thereafter, the powder layer forming step and the object molding liquid applying step are further repeated, to produce a laminate (molded object).

Set of Object Molding Liquid and Cleaning Liquid

A set of an object molding liquid and a cleaning liquid according to an embodiment of the present invention contains an object molding liquid containing a resin and a cleaning liquid for excessive powder removal containing a hydrocarbon solvent having an octanol/water partition coefficient (log $P_{ow}$ value) of 4.5 or more, and further contains other components as necessary.

In the set of the object molding liquid and the cleaning liquid according to an embodiment of the present invention, "the object molding liquid" and the "cleaning liquid for excessive powder removal" are the same as the object molding liquid and the cleaning liquid for excessive powder removal described in the "Cleaning Liquid for Excessive Powder Removal" and the "Method for Producing Three-Dimensional Molded Object" of the present disclosure.

The "cleaning liquid for excessive powder removal" in the set of the object molding liquid and the cleaning liquid according to an embodiment of the present invention can be suitably used exclusively for removing the excessive powder of the solidified object molded using the powder for molding.

EXAMPLES

The present invention will be described below by way of Examples. The present invention should not be construed as being limited to these Examples.

Preparation of Object Molding Liquids 1 to 3

Materials described in Table 2 were individually prepared, and mixed and stirred with a magnetic stirrer for 4 hours while being heated at 70° C. After 4 hours, heating was stopped, and the resultant was continuously stirred until the temperature became room temperature, to prepare object molding liquids 1 to 3.

TABLE 2

| | Material name | Component concentration (%) | Object molding liquid | | |
|---|---|---|---|---|---|
| | | | 1 | 2 | 3 |
| Organic solvent | Triglyme (triethylene glycol dimethyl ether) | 99 or more | 88.0 | | |
| | γ-butyrolactone | 99 or more | | 93.0 | 88.0 |
| Resin having structure unit represented by structural formula (1) | JMR-10LL (Vinyl acetate-based resin, polyvinyl acetate, degree of saponification: 10 mol %) | 99 or more | 12.0 | | |
| | S-LEC BL-10 (Vinyl acetate-based resin, polyvinyl butyral) | 99 or more | | 7.0 | |
| Resin having structure unit represented by structural formula (2) | PVP K25 (polyvinyl pyrrolidone) | 95 or more | | | 12.0 |
| | Total (%) | | 100.0 | 100.0 | 100.0 |

Numbers described in Table 2 are represented by % by mass.

The details of the materials described in Table 2 will be described below.

Organic Solvent

Triglyme (triethylene glycol dimethyl ether, available from Toho Chemical Industry Co., Ltd.: product name: High-solve MTM, log $P_{ow}$ value: −0.48)

γ-butyrolactone (available from Tokyo Chemical Industry Co., Ltd., log $P_{ow}$ value: −0.6)

Resin Having Structural Unit Represented by Structural Formula (1)

JMR-10LL (vinyl acetate-based resin, partially saponified polyvinyl acetate, degree of saponification: 10 mol %, available from Japan Vam & Poval Co., Ltd.)

Structural Formula

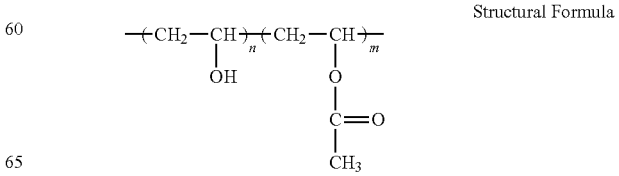

Ratio of a hydrophobic moiety in the resin:89 mol % to 91 mol %
Ratio of a hydrophilic moiety in the resin:9 mol % to 11 mol %
Tg: 30° C. to 40° C.
Softening point: about 105° C.
Number average molecular weight (Mn): 20000 or less
Component concentration: 99% by mass or more
10 g or more of the resin soluble in 100 g of triglyme (triethylene glycol dimethyl ether) at 25° C.
S-LEC BL-10 (vinyl acetate-based resin, polyvinyl butyral, available from Sekisui Chemical Co., Ltd.)

Structural Formula

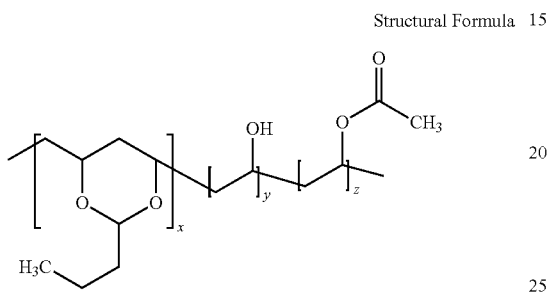

Ratio of a hydrophobic moiety in the resin:72 mol % (3 mol % of the structural unit represented by the structural formula (1), and 69 mol % of the structural unit represented by the structural formula (3))
Ratio of a hydrophilic moiety in the resin:28 mol %
Tg: 67° C.
Softening point: 100° C. to 120° C.
Number average molecular weight (Mn): about 15000
Component concentration: 99% by mass or more
10 g or more of the resin soluble in 100 g of γ-butyrolactone at 25° C.

Resin Having Structural Unit Represented by Structural Formula (2)
PVP K25 (Polyvinylpyrrolidone, available from FUJIFILM Wako Pure Chemical Corporation)

Structural Formula

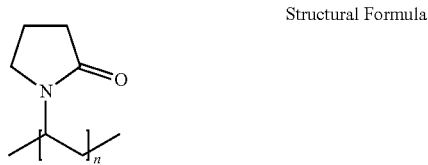

Softening point: 100° C. to 130° C.
Number average molecular weight (Mn): about 10,000 or less
Component concentration: 90% by mass or more
10 g or more of the resin soluble in 100 g of γ-butyrolactone at 25° C.

Using the prepared object molding liquids 1 to 3 and a powder containing metal particles (AlSi$_{10}$Mg powder (available from Toyo Aluminium K. K., Si$_{10}$Mg-30BB, with a volume average particle diameter of 35 μm, the surfaces of the metal particles not coated with a resin), each solidified object (an unsintered body and a green body) was produced as follows.

1) First, using a known apparatus for producing a molded object as illustrated in FIGS. 1A to 1E, the power was conveyed from a supplying-side powder storing tank to an object molding-side powder storing tank, to form a thin layer of the powder having an average thickness of 100 μm on a stage.
2) Next, the object molding liquid was discharged and applied from a nozzle of a known inkjet discharging head to the surface of the formed thin layer of the powder, and the binder resin was disposed around a core material by the action of the binder resin contained in a curing liquid. The region to which the object molding liquid was discharged had a rectangular shape of 40 mm in length x 10 mm in width.
3) Next, the operations of 1) and 2) were repeated until the total average thickness reached 3 mm, and thin layers of the solidified powder were sequentially laminated, to form a laminate. The laminate was appropriately subjected to a drying step using a drying device under optimal heating conditions according to the softening point of each resin, to obtain a solidified object (unsintered body).
4) The dried solidified object (unsintered body) was blown with air to remove any excessive powder, and a solidified object (unsintered body) prepared by the object molding liquid 1 was then obtained.

Two solidified objects (unsintered bodies) were prepared for each of the object molding liquids 1 to 3. Hereinafter, the solidified object (unsintered body) is simply referred to as the unsintered body.

Next, the prepared unsintered body was evaluated for "the bending strength of the unsintered body before and after being immersed in the cleaning liquid" and "the state of the unsintered body after being immersed in the cleaning liquid".

Bending Strength of Unsintered Body before and after Being Immersed in Cleaning Liquid Before being Immersed in Cleaning Liquid The bending strength of the unsintered body before being immersed in the cleaning liquid was evaluated based on the following evaluation criteria by measuring the bending strength of the unsintered body prepared in the above 4). For the measurement of the bending strength, a universal tester (Autograph, model AG-I) available from Shimadzu Corporation was, a 1 kN load cell, and a three-point bending jig were used. Stress when the distance between fulcra was set to 24 mm and the load point was displaced at a speed of 1 mm/min was plotted with respect to strain. The stress at the breaking point was taken as the maximum stress.

Evaluation Criteria
A: The bending strength was 5 MPa or more.
B: The bending strength was 3 MPa or more and less than 5 MPa.
C: The bending strength was 2.7 MPa or more and less than 3 MPa.
D: The bending strength was less than 2.7 MPa.

After Being Immersed in Cleaning Liquid

The unsintered body prepared in 4) above was immersed in each of the cleaning liquids illustrated in Tables 3 to 6 in a vat in an ultrasonic bath for 30 minutes, and the bending strength of the unsintered body after being immersed in the cleaning liquid was then measured in the same manner as before being immersed in the cleaning liquid. The evaluation method and the evaluation criteria are also the same as the evaluation method and the evaluation criteria before immersed in the cleaning liquid.

State of Unsintered Body after Being Immersed in Cleaning Liquid

In the evaluation of "the bending strength of the unsintered body after being immersed in the cleaning liquid", the state of the unsintered body after being immersed in the cleaning liquid was visually observed, and "the state of the unsintered body after being immersed in the cleaning liquid" was evaluated based on the following evaluation criteria. If the evaluation result is "good", the unsintered body has no problem in use. FIGS. 2A to 15B illustrate photographs of the states of the unsintered body immediately after being immersed in the cleaning liquid and after being immersed for 30 minutes in the ultrasonic bath.

Figure 2A:
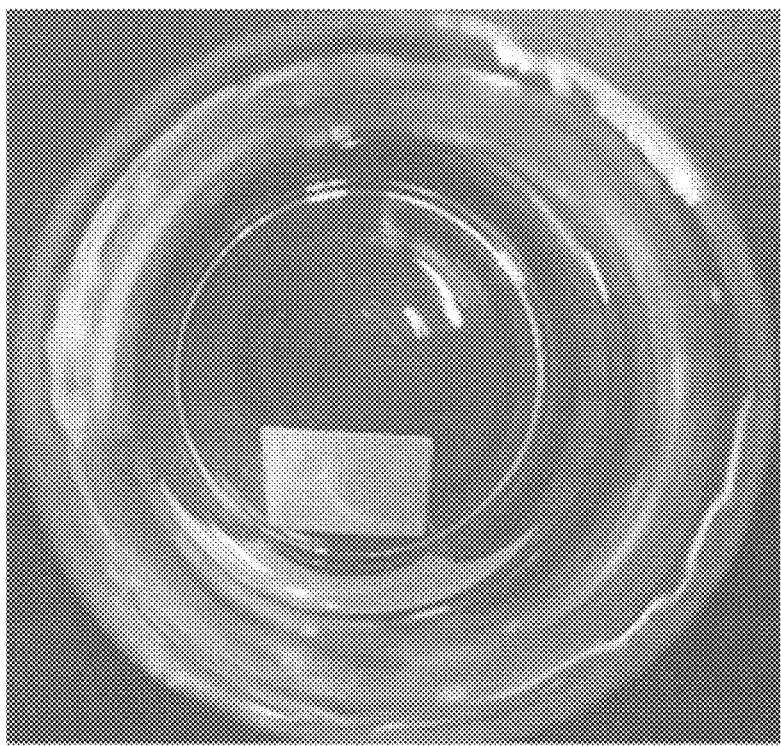
FIG. 2A is a photograph of the state of an unsintered body immediately after being immersed in a cleaning liquid in Example 1.
Figure 2B:
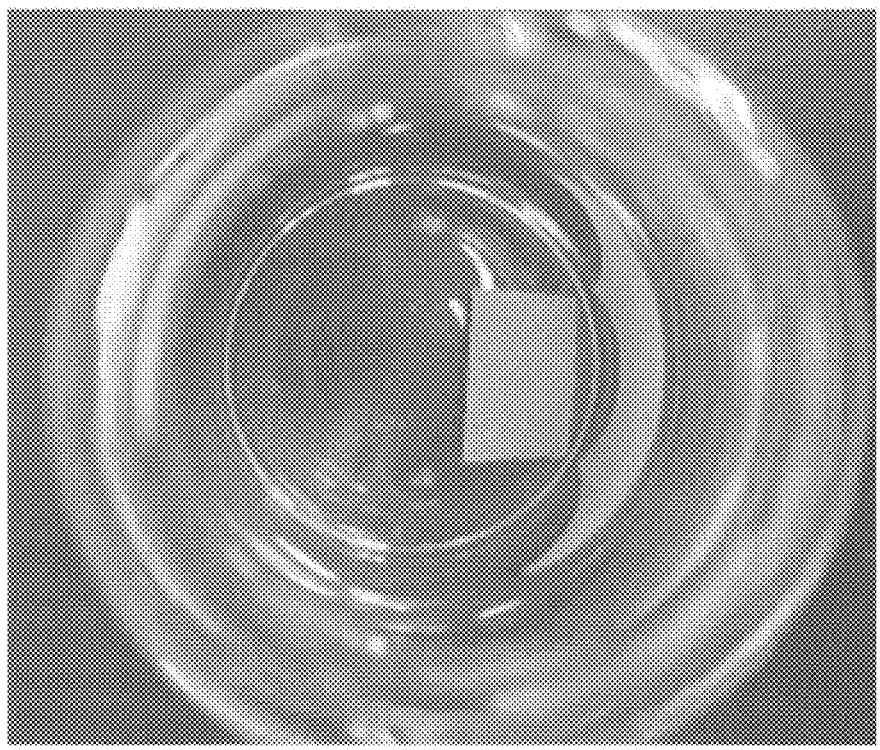
FIG. 2B is a photograph of the state of an unsintered body after being immersed in a cleaning liquid for 30 minutes while being subjected to ultrasonic treatment in an ultrasonic bath in Example 1.
Figure 3A:
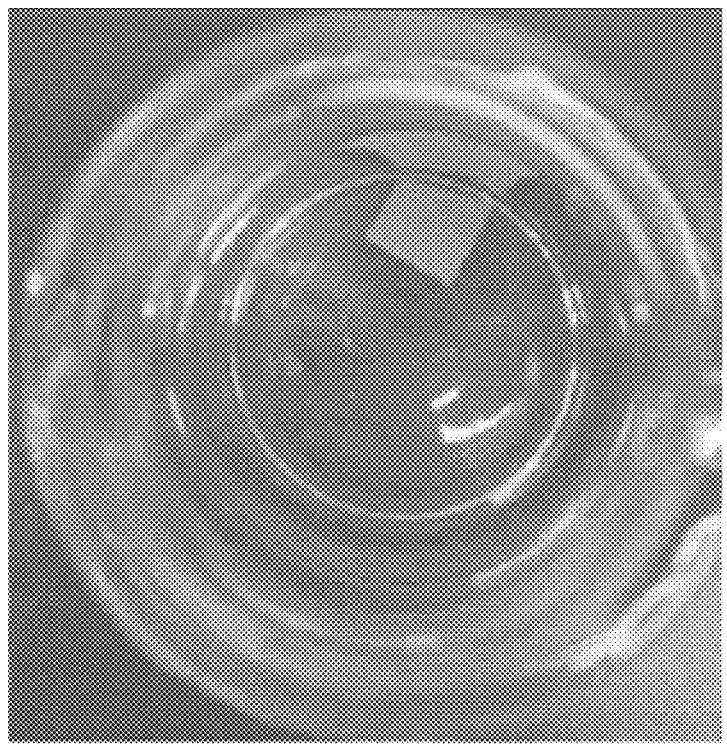
FIG. 3A is a photograph of the state of an unsintered body immediately after being immersed in a cleaning liquid in Example 2.
Figure 3B:
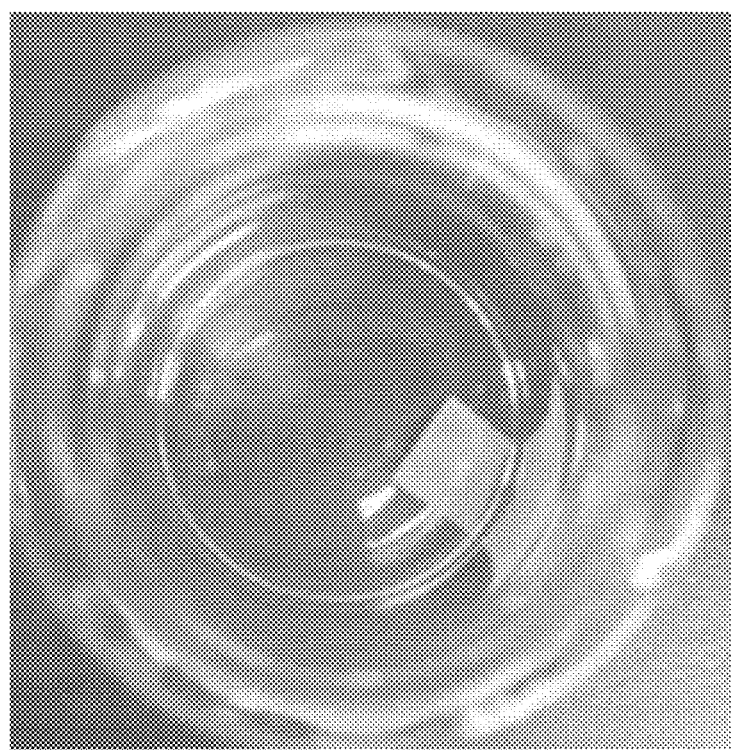
FIG. 3B is a photograph of the state of an unsintered body after being immersed in a cleaning liquid for 30 minutes while being subjected to ultrasonic treatment in an ultrasonic bath in Example 2.
Figure 4A:
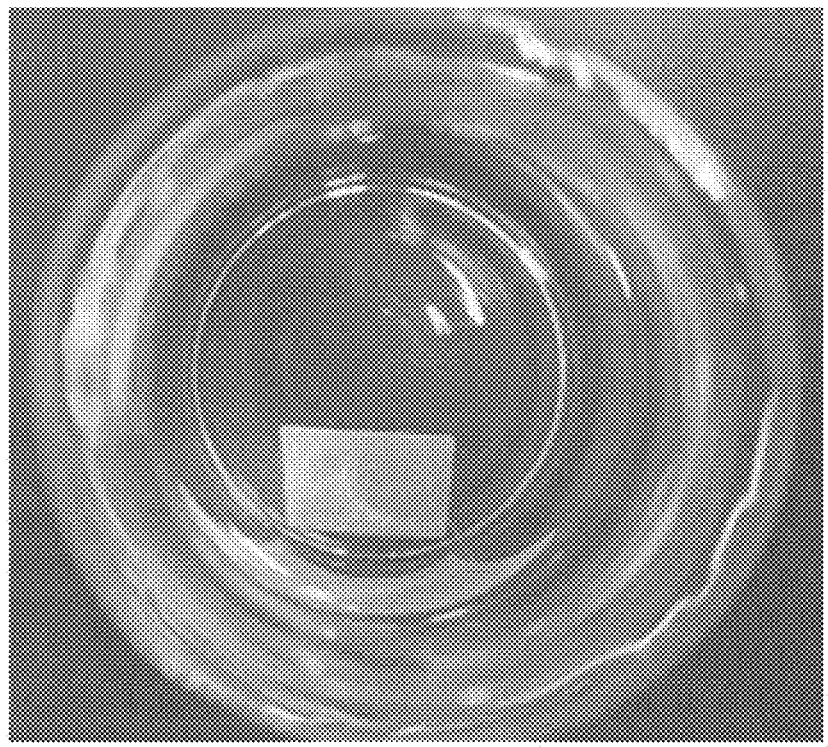
FIG. 4A is a photograph of the state of an unsintered body immediately after being immersed in a cleaning liquid in Example 3.
Figure 4B:
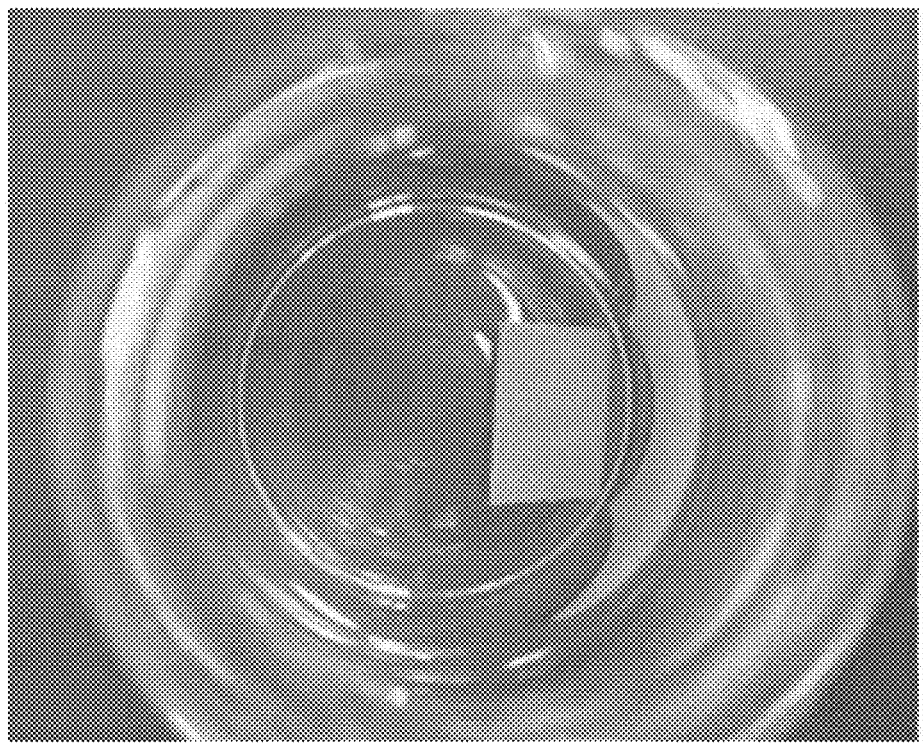
FIG. 4B is a photograph of the state of an unsintered body after being immersed in a cleaning liquid for 30 minutes while being subjected to ultrasonic treatment in an ultrasonic bath in Example 3.
Figure 5A:
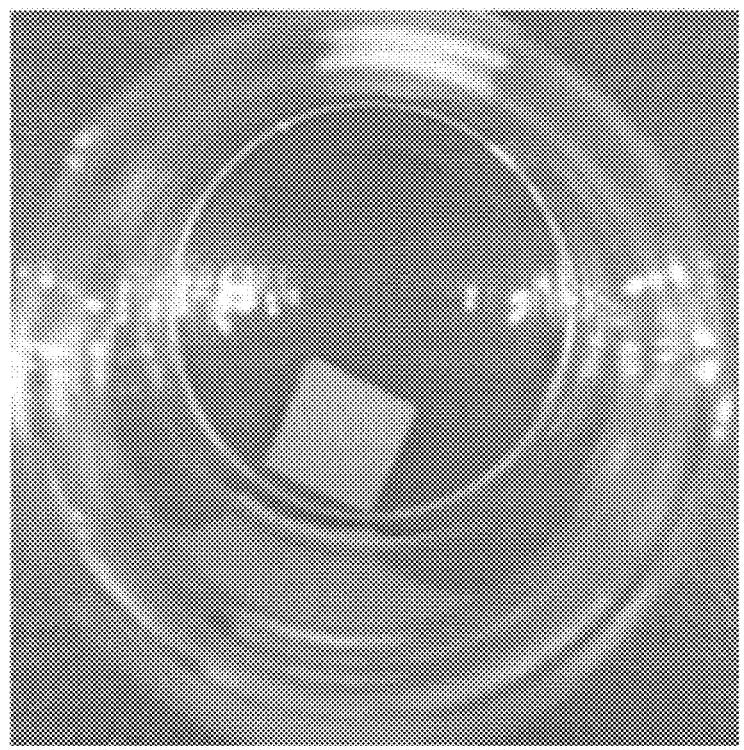
FIG. 5A is a photograph of the state of an unsintered body immediately after being immersed in a cleaning liquid in Example 4.
Figure 5B:
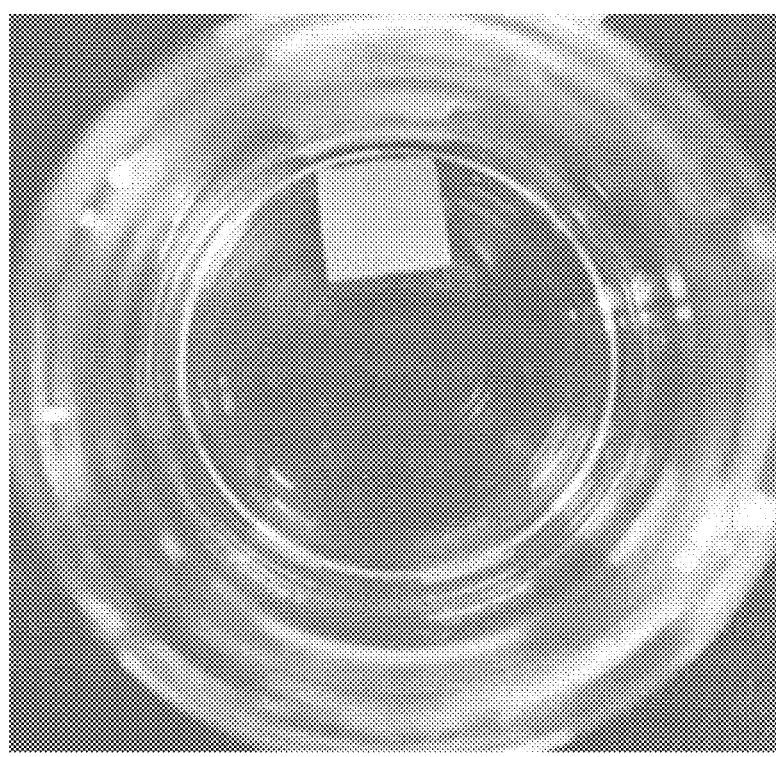
FIG. 5B is a photograph of the state of an unsintered body after being immersed in a cleaning liquid for 30 minutes while being subjected to ultrasonic treatment in an ultrasonic bath in Example 4.
Figure 6A:
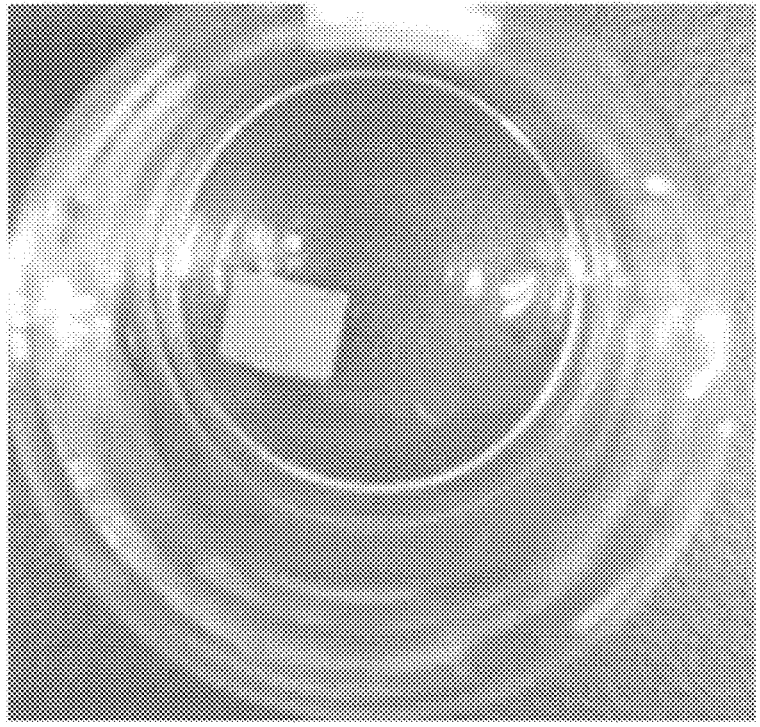
FIG. 6A is a photograph of the state of an unsintered body immediately after being immersed in a cleaning liquid in Comparative Example 1.
Figure 6B:
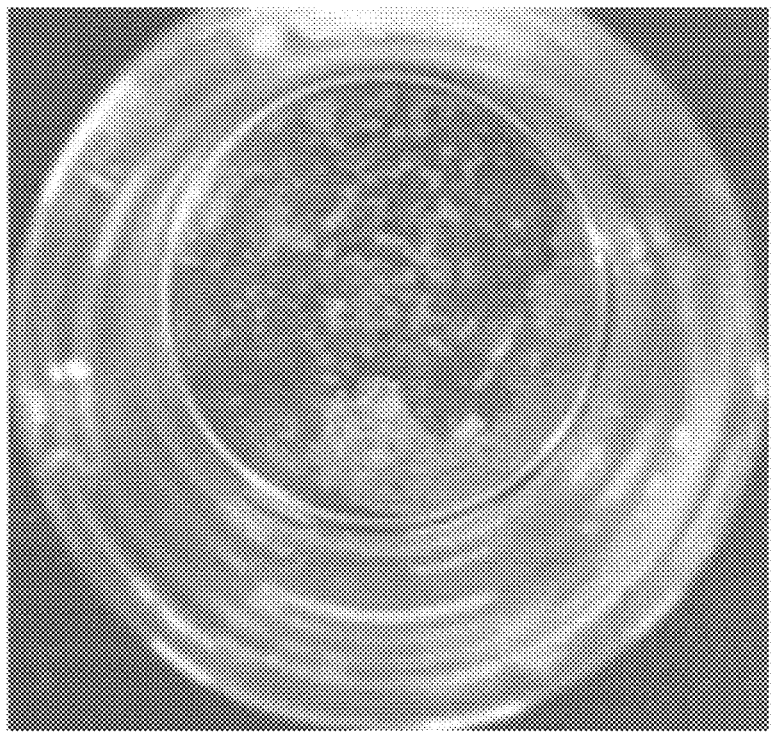
FIG. 6B is a photograph of the state of an unsintered body after being immersed in a cleaning liquid for 30 minutes while being subjected to ultrasonic treatment in an ultrasonic bath in Comparative Example 1.
Figure 7A:
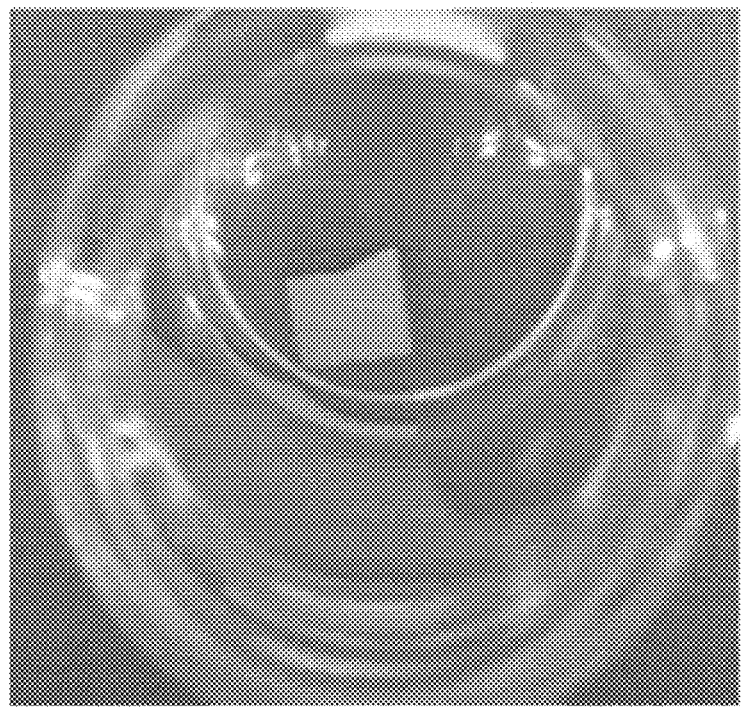
FIG. 7A is a photograph of the state of an unsintered body immediately after being immersed in a cleaning liquid in Comparative Example 2.
Figure 7B:
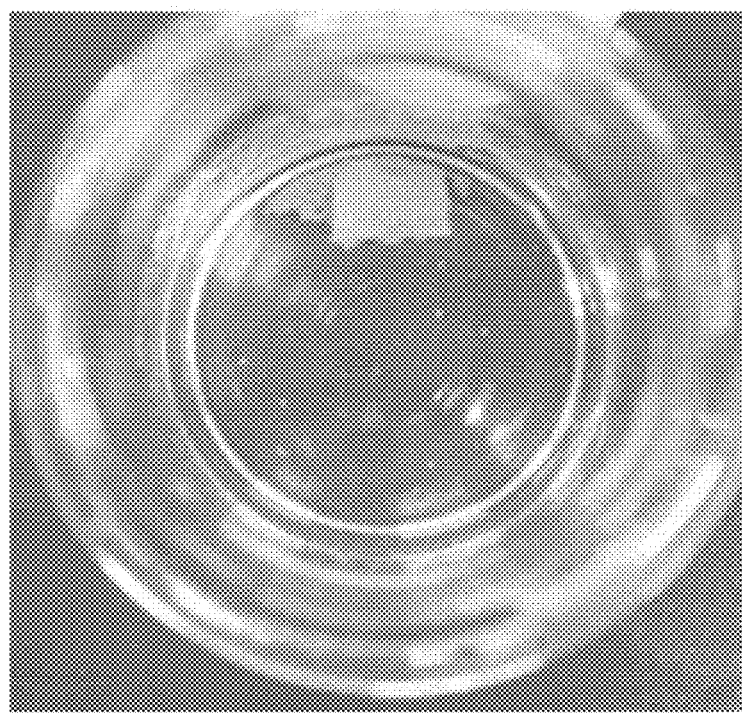
FIG. 7B is a photograph of the state of an unsintered body after being immersed in a cleaning liquid for 30 minutes while being subjected to ultrasonic treatment in an ultrasonic bath in Comparative Example 2.
Figure 8A:
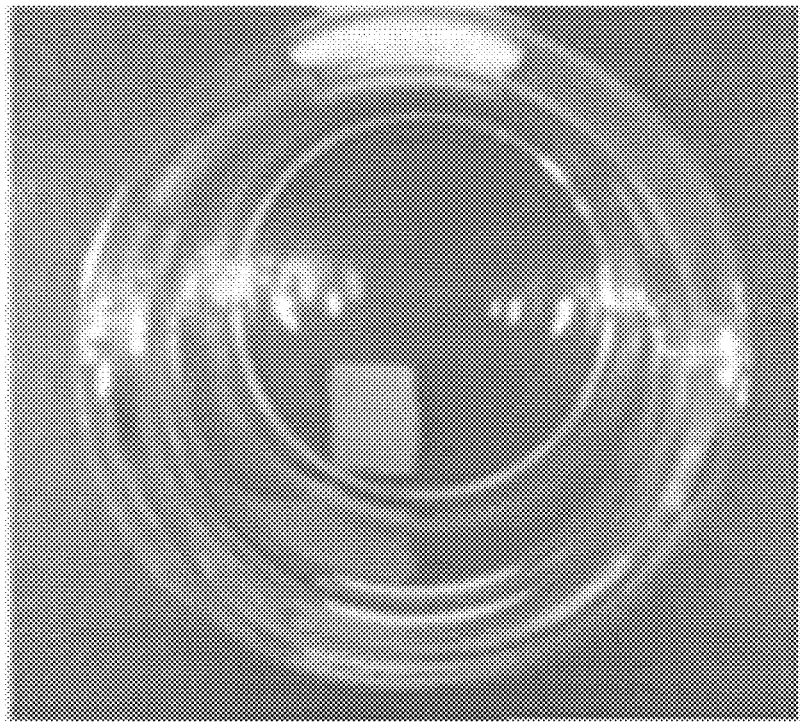
FIG. 8A is a photograph of the state of an unsintered body immediately after being immersed in a cleaning liquid in Comparative Example 3.
Figure 8B:
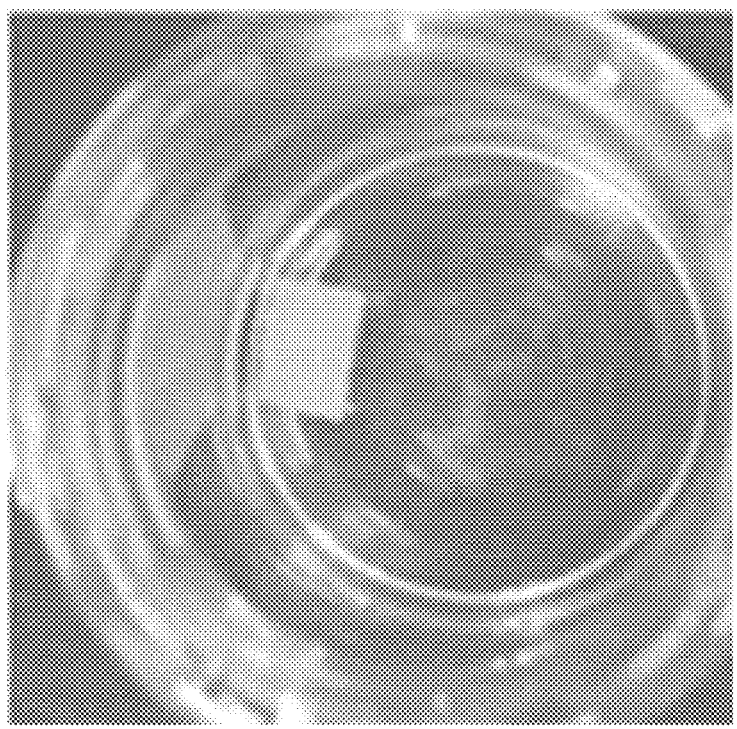
FIG. 8B is a photograph of the state of an unsintered body after being immersed in a cleaning liquid for 30 minutes while being subjected to ultrasonic treatment in an ultrasonic bath in Comparative Example 3.
Figure 9A:
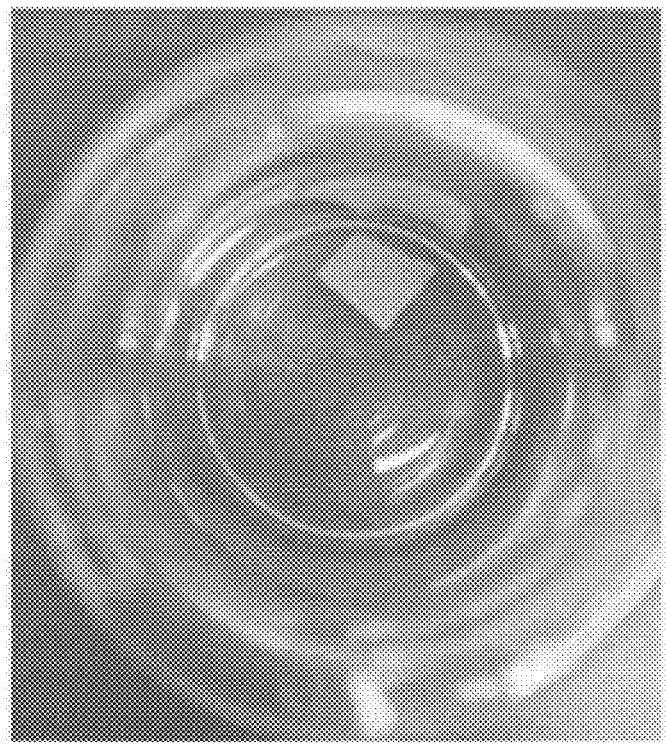
FIG. 9A is a photograph of the state of an unsintered body immediately after being immersed in a cleaning liquid in Example 5.
Figure 9B:
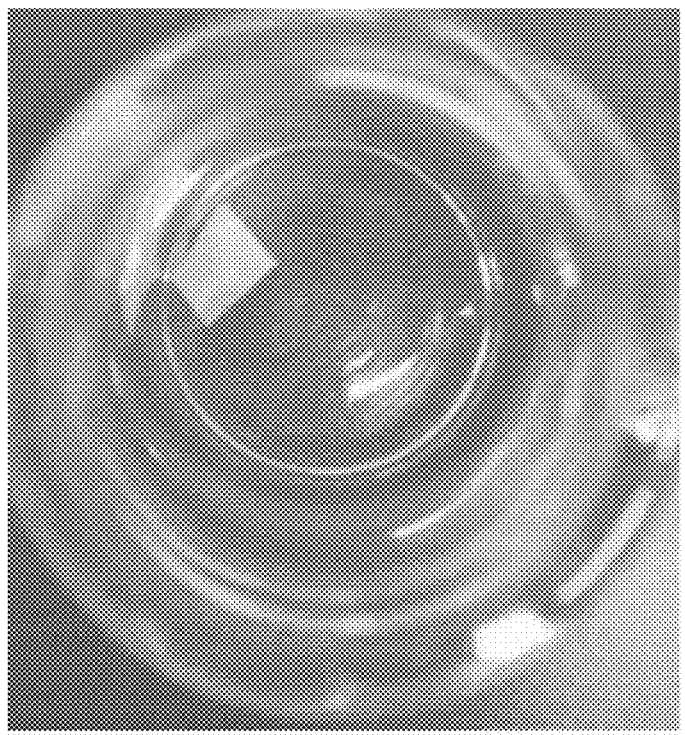
FIG. 9B is a photograph of the state of an unsintered body after being immersed in a cleaning liquid for 30 minutes while being subjected to ultrasonic treatment in an ultrasonic bath in Example 5.
Figure 10A:
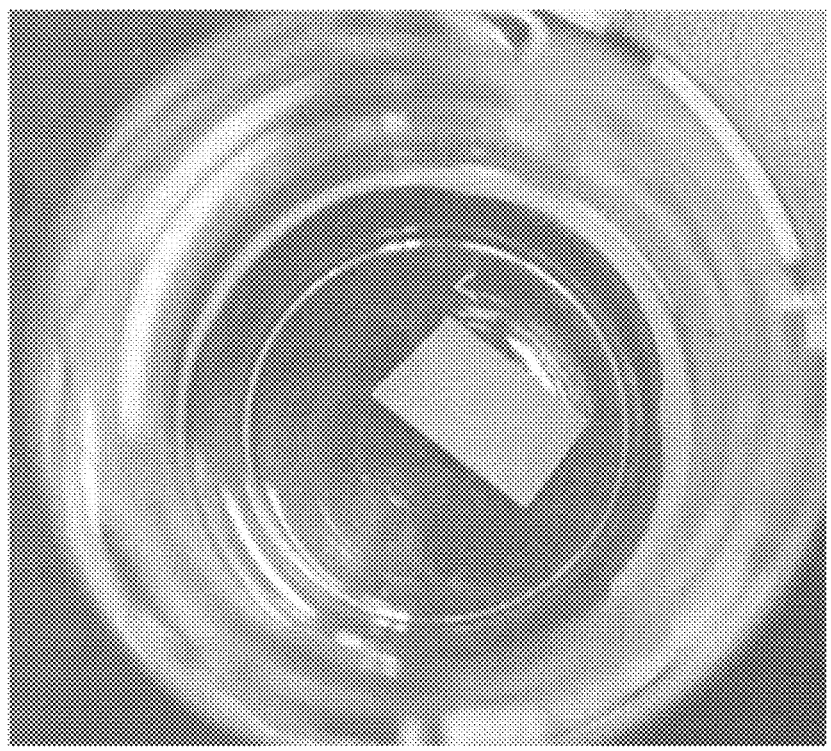
FIG. 10A is a photograph of the state of an unsintered body immediately after being immersed in a cleaning liquid in Example 6.
Figure 10B:
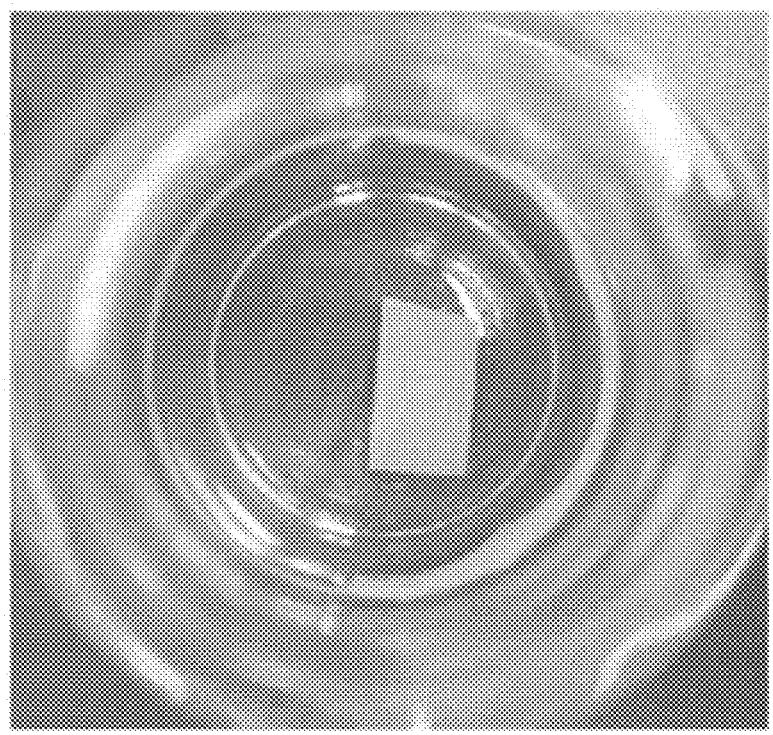
FIG. 10B is a photograph of the state of an unsintered body after being immersed in a cleaning liquid for 30 minutes while being subjected to ultrasonic treatment in an ultrasonic bath in Example 6.
Figure 11A:
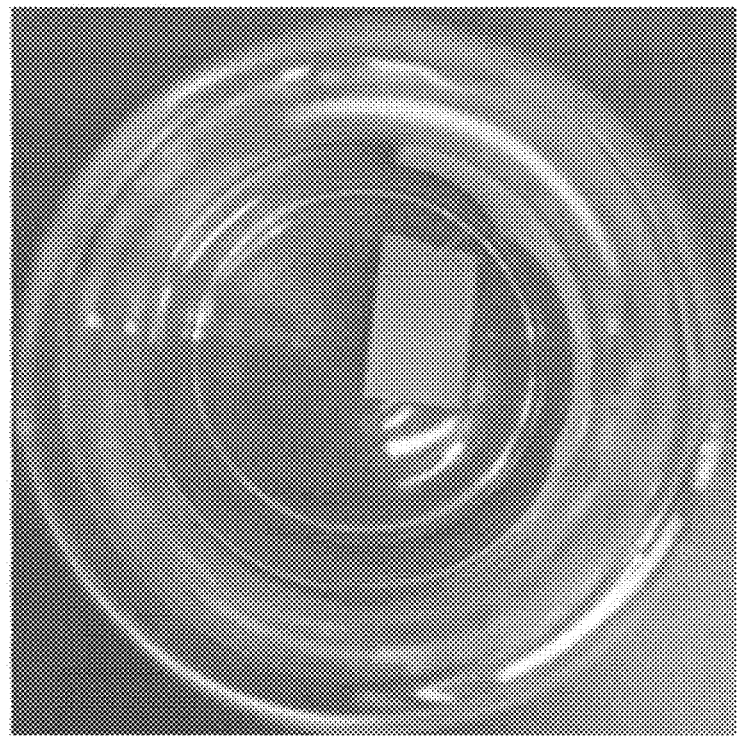
FIG. 11A is a photograph of the state of an unsintered body immediately after being immersed in a cleaning liquid in Comparative Example 4.
Figure 11B:
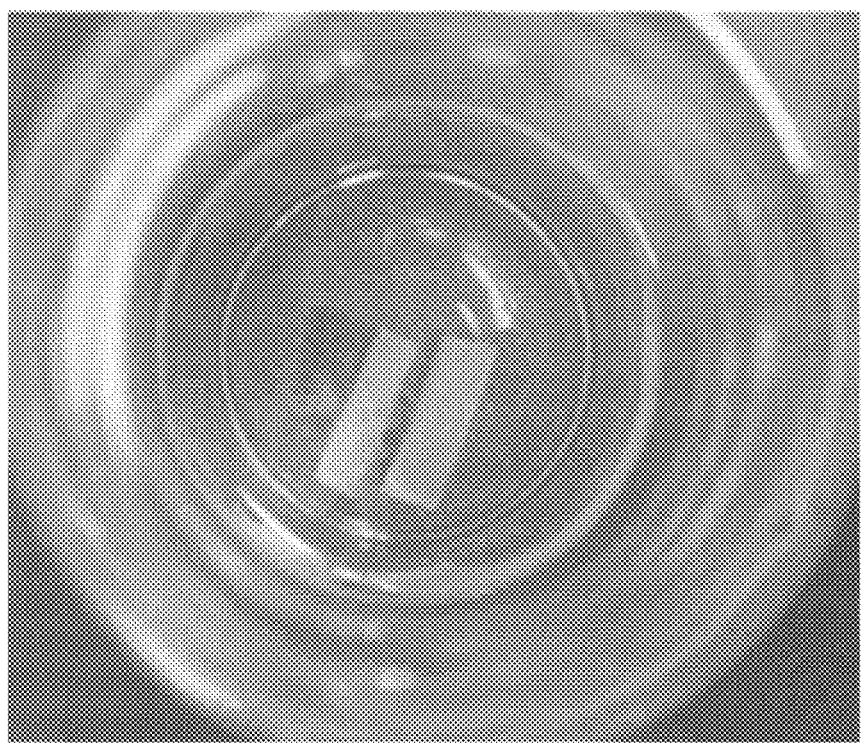
FIG. 11B is a photograph of the state of an unsintered body after being immersed in a cleaning liquid for 30 minutes while being subjected to ultrasonic treatment in an ultrasonic bath in Comparative Example 4.
Figure 12A:
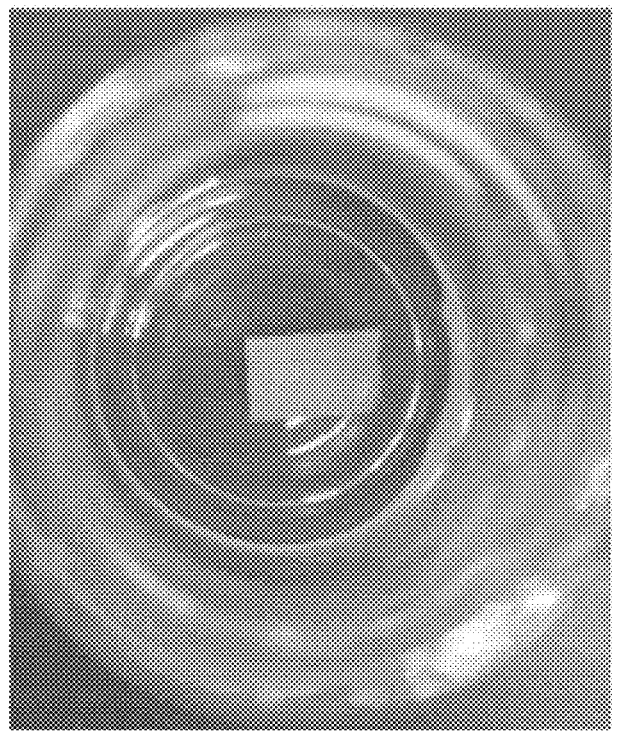
FIG. 12A is a photograph of the state of an unsintered body immediately after being immersed in a cleaning liquid in Comparative Example 5.
Figure 12B:
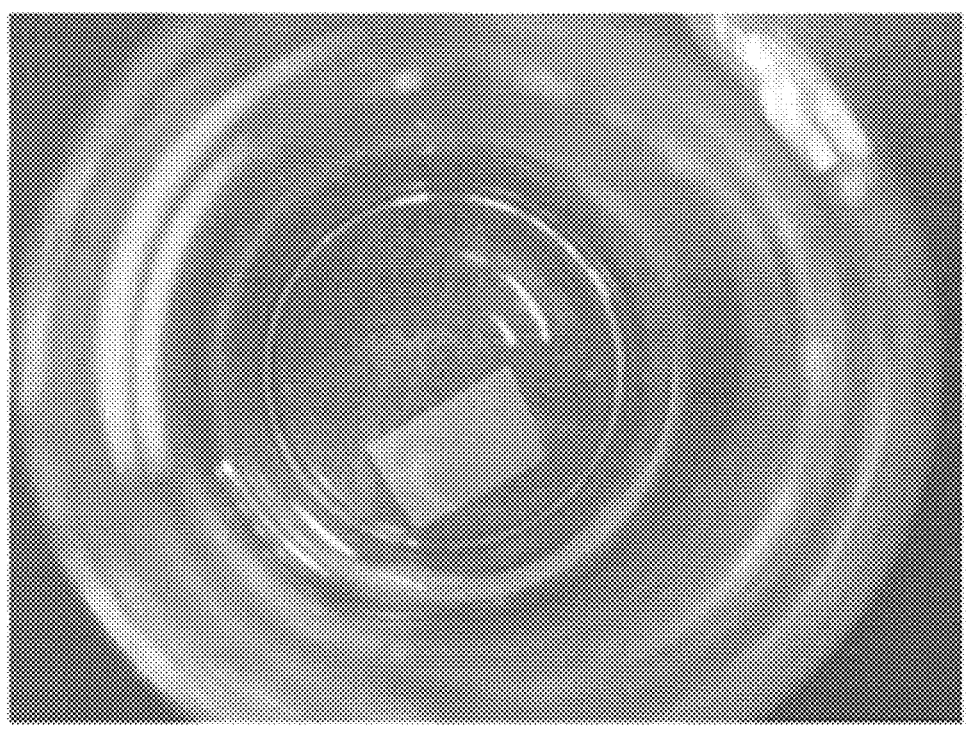
FIG. 12B is a photograph of the state of an unsintered body after being immersed in a cleaning liquid for 30 minutes while being subjected to ultrasonic treatment in an ultrasonic bath in Comparative Example 5.
Figure 13A:
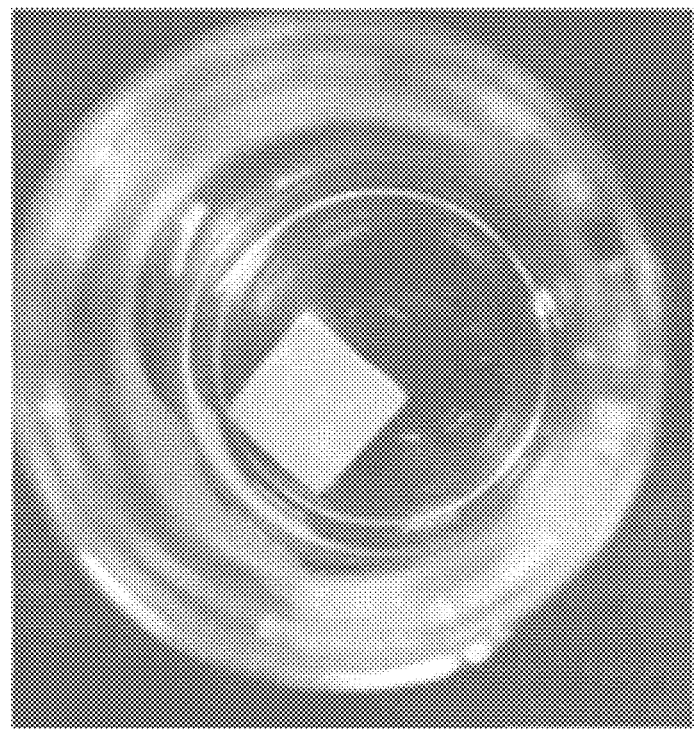
FIG. 13A is a photograph of the state of an unsintered body immediately after being immersed in a cleaning liquid in Example 7.
Figure 13B:
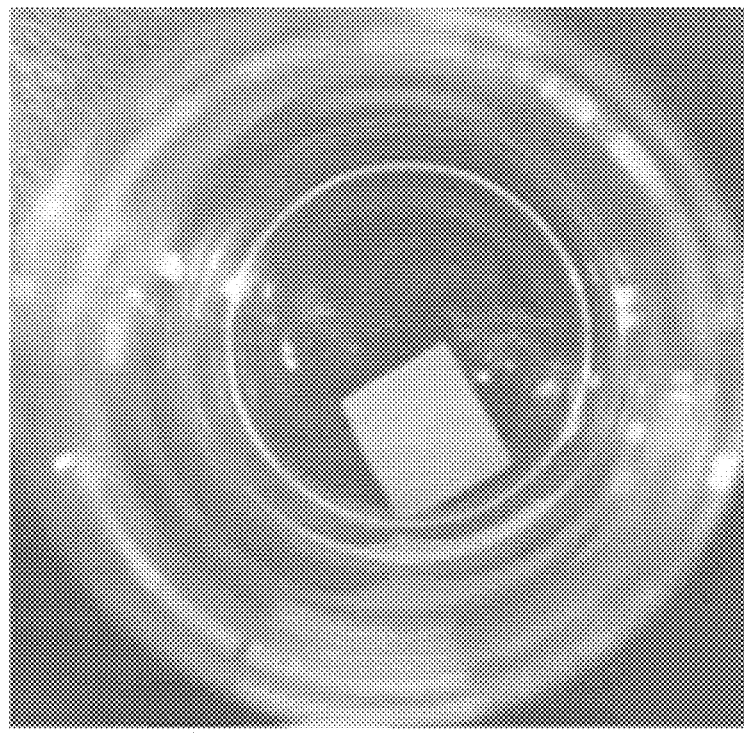
FIG. 13B is a photograph of the state of an unsintered body after being immersed in a cleaning liquid for 30 minutes while being subjected to ultrasonic treatment in an ultrasonic bath in Example 7.
Figure 14A:
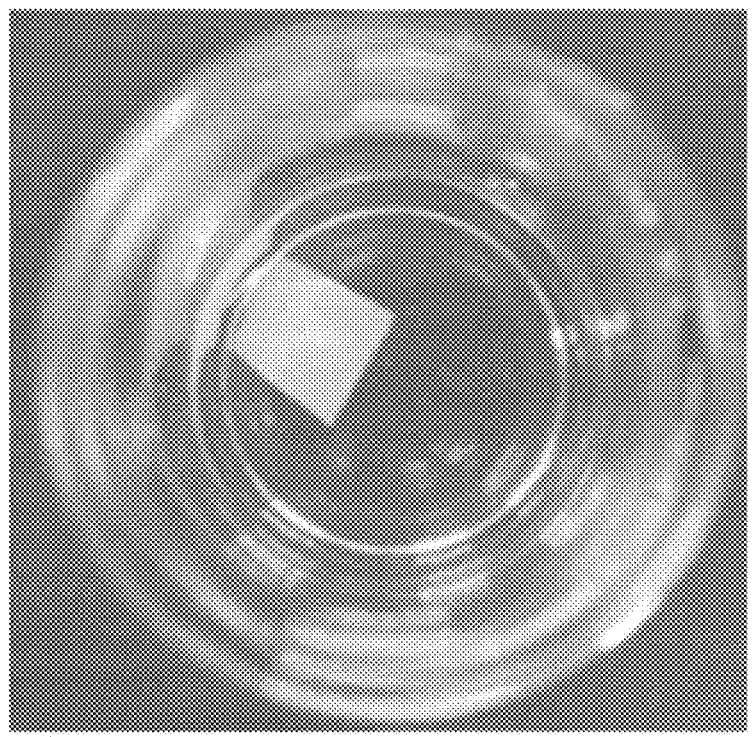
FIG. 14A is a photograph of the state of an unsintered body immediately after being immersed in a cleaning liquid in Example 8.
Figure 14B:
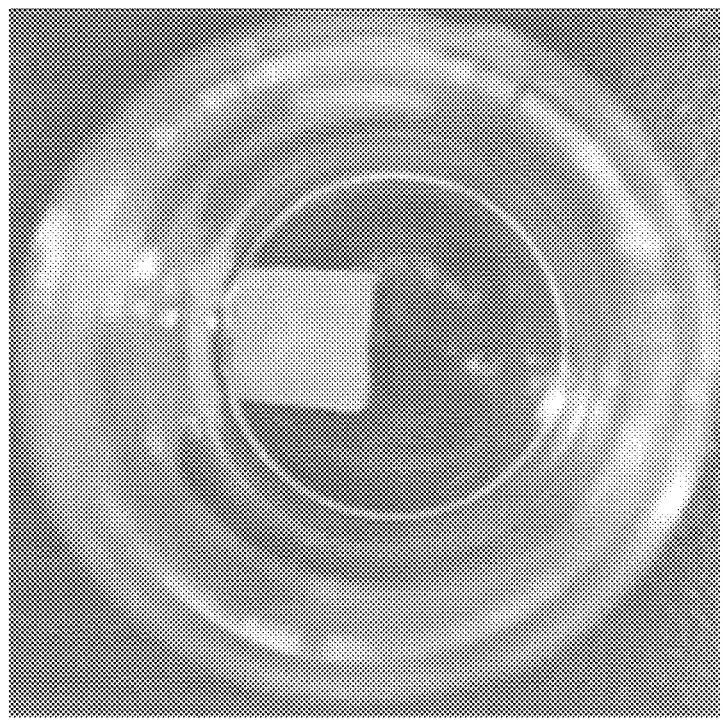
FIG. 14B is a photograph of the state of an unsintered body after being immersed in a cleaning liquid for 30 minutes while being subjected to ultrasonic treatment in an ultrasonic bath in Example 8.
Figure 15A:
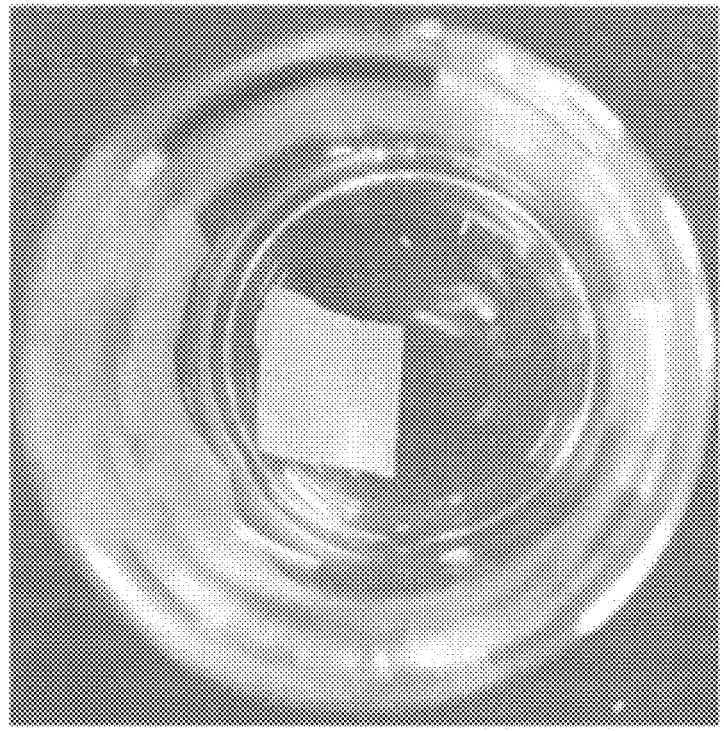
FIG. 15A is a photograph of the state of an unsintered body immediately after being immersed in a cleaning liquid in Comparative Example 6.
Figure 15B:
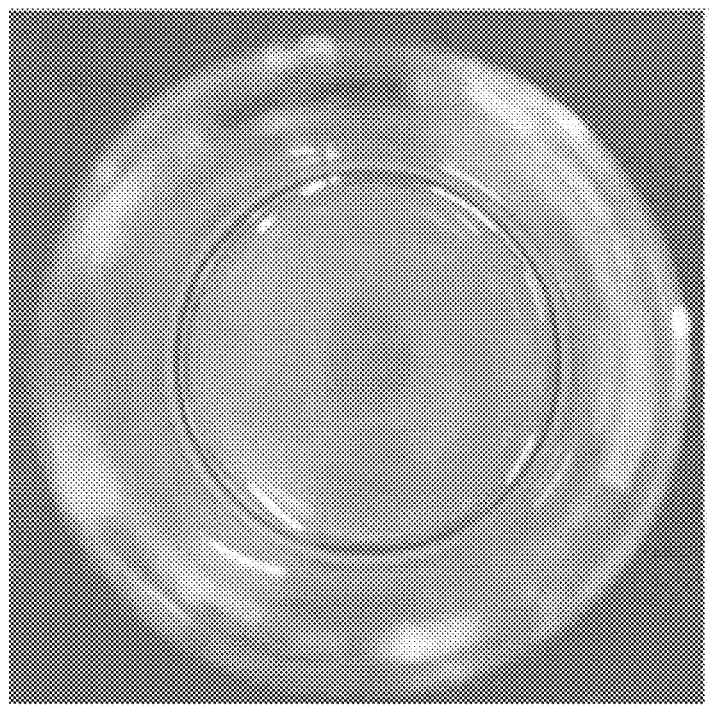
FIG. 15B is a photograph of the state of an unsintered body after being immersed in a cleaning liquid for 30 minutes while being subjected to ultrasonic treatment in an ultrasonic bath in Comparative Example 6.

FIGS. 2A and 2B illustrate the results of Example 1, FIGS. 3A and 3B illustrate the results of Example 2, FIGS. 4A and 4B illustrate the results of Example 3, FIGS. 5A and 5B illustrate the results of Example 4, FIGS. 6A and 6B illustrate the results of Comparative Example 1, FIGS. 7A and 7B illustrate the results of Comparative Example 2, FIGS. 8A and 8B illustrate the results of Comparative Example 3, FIGS. 9A and 9B illustrate the results of Example 5, FIGS. 10A and 10B illustrate the results of Example 6, FIGS. 11A and 11B illustrate the results of Comparative Example 4, FIGS. 12A and 12B illustrate the results of Comparative Example 5, FIGS. 13A and 13B illustrate the results of Example 7, FIGS. 14A and 14B illustrate the results of Example 8, and FIGS. 15A and 15B illustrate the results of Comparative Example 6

Evaluation Criteria

Good: The shape of the unsintered body does not change from the shape of the unsintered body before being immersed.

Poor: The end of the unsintered body collapses and is returning to the powder.

Bad: The shape of the unsintered body collapses and returns to the powder.

TABLE 3

| | | Examples | | | |
|---|---|---|---|---|---|
| | | 1 | 2 | 3 | 4 |
| | | Object molding liquid | | | |
| | | 1 | 1 | 1 | 1 |
| Cleaning liquid | Kind | Decane | Dodecane | Tetradecane | p-menthane |
| | Chemical formula | $C_{10}H_{22}$ | $C_{12}H_{26}$ | $C_{14}H_{30}$ | $C_{10}H_{20}$ |
| | Octanol/water partition coefficient ($logP_{ow}$ value) | 5.0 | 6.1 | 7.2 | 5.5 |
| | Boiling point (° C.) | 172 to 174 | 215 | 253 | 167 to 170 |
| | Flash point (° C.) | 46 to 53 | 74 | 120 | 39 |
| Evaluation results | Strength before being immersed (MPa) | A (5.3) | A (5.2) | A (5.1) | B (4.9) |
| | Strength after being immersed (MPa) | A (5.4) | A (5.2) | A (5.2) | B (4.8) |
| | Immersion evaluation | Good | Good | Good | Good |

TABLE 4

| | | Comparative Examples | | |
|---|---|---|---|---|
| | | 1 | 2 | 3 |
| | | Object molding liquid | | |
| | | 1 | 1 | 1 |
| Cleaning liquid | Kind | D-limonene | Terpinolene | α-pinene |
| | Chemical formula | $C_{10}H_{16}$ | $C_{10}H_{16}$ | $C_{10}H_{16}$ |
| | Octanol/water partition coefficient ($logP_{ow}$ value) | 3.4 | 2.8 | 2.8 |
| | Boiling point (° C.) | 176 | 186 | 156 |
| | Flash point (° C.) | 48 | 64 | 33 |
| Evaluation results | Strength before being immersed (MPa) | A(5.2) | A (5.0) | A (5.0) |
| | Strength after being immersed (MPa) | D (−) | D (−) | D (−) |
| | Immersion evaluation | Bad | Bad | Poor |

TABLE 5

| | | Examples | | Comparative Examples | |
|---|---|---|---|---|---|
| | | 5 | 6 | 4 | 5 |
| | | | Object molding liquid | | |
| | | 2 | 2 | 2 | 2 |
| Cleaning liquid | Kind | Decane | p-menthane | β-pinene | Hexane |
| | Chemical formula | $C_{10}H_{22}$ | $C_{10}H_{20}$ | $C_{10}H_{16}$ | $C_6H_{14}$ |
| | Octanol/water partition coefficient ($logP_{ow}$ value) | 5.0 | 5.5 | 2.8 | 3.9 |
| | Boiling point (° C.) | 172 to 174 | 167 to 170 | 155 to 156 | 69 |
| | Flash point (° C.) | 46 to 53 | 39 | 33 | −23 |
| Evaluation results | Strength before being immersed (MPa) | B (4.3) | B (4.7) | B (4.5) | B (4.5) |
| | Strength after being immersed (MPa) | B (4.3) | B (4.5) | D (−) | D (−) |
| | Immersion evaluation | Good | Good | Poor | Poor |

TABLE 6

| | | Examples | | Comparative Examples |
|---|---|---|---|---|
| | | 7 | 8 | 6 |
| | | | Object molding liquid | |
| | | 3 | 3 | 3 |
| Cleaning liquid | Kind | Decane | p-menthane | Propylene carbonate |
| | Chemical formula | $C_{10}H_{22}$ | $C_{10}H_{20}$ | $C_4H_6O_3$ |
| | Octanol/water partition coefficient ($logP_{ow}$ value) | 5.0 | 5.5 | −0.4 |
| | Boiling point (° C.) | 172 to 174 | 167 to 170 | 240 |
| | Flash point (° C.) | 46 to 53 | 39 | 132 |
| Evaluation results | Strength before being immersed (MPa) | A (5.1) | A (5.3) | A (5.6) |
| | Strength after being immersed (MPa) | A (4.9) | A (5.3) | D (−) |
| | Immersion evaluation | Good | Good | Bad |

From the results of Examples 1 to 8, when the value of the octanol/water partition coefficient $logP_{ow}$ was 4.5 or more, the unsintered body did not change before and after being immersed in the cleaning liquid, and the cleaning liquid could be used as a cleaning liquid for excessive powder removal while the shape of the unsintered body was retained. From Examples 1 to 8, the physical strength (bending strength) of the unsintered body before and after being immersed in the cleaning liquid did not decrease.

From the results of Comparative Examples 1 to 5, if a hydrocarbon solvent had a short double bond or a short molecular chain even when the hydrocarbon solvent was composed only of carbon and hydrogen, the $logP_{ow}$ value of the hydrocarbon solvent was low. The unsintered body collapsed when being immersed in the cleaning liquid, or the shape of the unsintered body partially collapsed.

From the results of Comparative Example 6, when the $logP_{ow}$ value of the hydrocarbon solvent was extremely low, the unsintered body completely returned to the powder.

Embodiments of the present invention include the following items.

<1> A cleaning liquid for excessive powder removal that comprises a hydrocarbon solvent having an octanol/water partition coefficient ($logP_{ow}$ value) of 4.5 or more, wherein the cleaning liquid is to remove excessive powder for molding adhering to a solidified object molded using the powder for moldins.

<2> The cleaning liquid for excessive powder removal according to <1>, wherein the powder for molding is a powder containing metal particles not coated with a resin.

<3> The cleaning liquid for excessive powder removal according to any one of <1> and <2>, wherein the hydrocarbon solvent has an octanol/water partition coefficient (log $P_{ow}$ value) of 5.0 or more.

<4> The cleaning liquid for excessive powder removal according to any one of <1> to <3>, wherein the hydrocarbon solvent contains no double bond in a molecule.

<5> The cleaning liquid for excessive powder removal according to any one of <1> to <4>, wherein the hydrocarbon solvent is a hydrocarbon having a straight-chained structure and having 7 or more and 15 or less carbon atoms.

<6> The cleaning liquid for excessive powder removal according to any one of <1> to <4>, wherein the hydrocarbon solvent contains at least any one of decane, undecane, dodecane, tridecane, tetradecane, and p-menthane.

<7> A method for producing a three-dimensional molded object, the method comprising:

a powder layer forming step of forming a powder layer containing a powder for molding;

an object molding liquid applying step of applying an object molding liquid containing a resin to the powder layer to form a molded object;

a solidifying step of solidifying the molded object to obtain a solidified object; and an excessive powder removing step of removing excessive powder for molding adhering to the solidified object with a cleaning liquid containing a hydrocarbon solvent having an octanol/water partition coefficient (log $P_{ow}$ value) of 4.5 or more.

<8> The method for producing a three-dimensional molded object according to <7>, wherein the resin is soluble in a solvent A, and an octanol/water partition coefficient (log $P_{ow}$ value) of the solvent A is −1.8 or more and 3.4 or less.

<9> The method for producing a three-dimensional molded object according to any one of <7> and <8>, wherein the powder for molding is a powder containing metal particles not coated with a resin.

<10> The method for producing a three-dimensional molded object according to any one of <7> to <9>, wherein the resin contained in the object molding liquid has at least any one of a structural unit represented by the following structural formula (1) and a structural unit represented by the following structural formula (2).

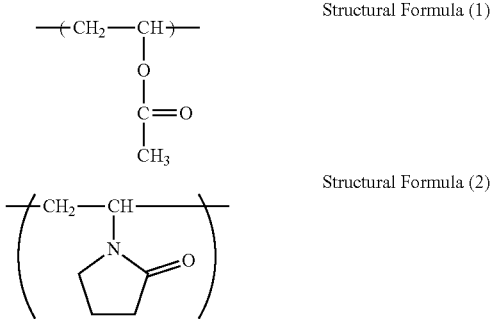

Structural Formula (1)

Structural Formula (2)

<11> The method for producing a three-dimensional molded object according to any one of <7> to <10>, wherein the excessive powder removing step includes removing the powder for molding adhering to the solidified object by ultrasonic treatment.

<12> A set containing: an object molding liquid containing a resin; and a cleaning liquid for excessive powder removal containing a hydrocarbon solvent having an octanol/water partition coefficient (log $P_{ow}$ value) of 4.5 or more.

<13> The set according to <12>, wherein the resin is soluble in a solvent A, and an octanol/water partition coefficient (log $P_{ow}$ value) of the solvent A is −1.8 or more and 3.4 or less.

<14> An apparatus for producing a three-dimensional molded object, the apparatus comprising: a powder layer forming unit configured to form a powder layer containing a powder for molding; an object molding liquid applying unit configured to apply an object molding liquid containing a resin to the powder layer to form a molded object; a solidifying unit configured to solidify the molded object to obtain a solidified object; a cleaning liquid to remove excessive powder for molding adhering to the solidified object, containing a hydrocarbon solvent having an octanol/water partition coefficient (log $P_{ow}$ value) of 4.5 or more; a cleaning liquid storing container storing the cleaning liquid; and an excessive powder removing unit configured to remove excessive powder for molding adhering to the solidified object with the cleaning liquid.

<15> The apparatus for producing a three-dimensional molded object according to <14>, wherein the resin is soluble in a solvent A, and an octanol/water partition coefficient (log $P_{ow}$ value) of the solvent A is −1.8 or more and 3.4 or less.

The cleaning liquid for excessive powder removal according to any one of <1> to <6>, the method for producing a three-dimensional molded object according to any one of <7> to <11>, the set of the object molding liquid and the cleaning liquid according to any one of <12> and <13>, and the production of a three-dimensional molded object according to any one of <14> and <15> solve the above-described problems an achieve the object of the present invention.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A method for producing a three-dimensional molded object, the method comprising:

forming a powder layer containing a powder for molding;

applying an object molding liquid containing a resin to the powder layer to form a molded object;

solidifying the molded object to obtain a solidified object; and removing excessive powder for molding adhering to the solidified object with a cleaning liquid containing a hydrocarbon solvent having an octanol/water partition coefficient (log$P_{ow}$ value) of 4.5 or more, wherein the resin is soluble in a solvent A, and an octanol/water partition coefficient (log$P_{ow}$ value) of the solvent A is −1.8 or more and 3.4 or less.

2. The method for producing a three-dimensional molded object according to claim 1, wherein the powder for molding is a powder containing metal particles not coated with a resin.

3. The method for producing a three-dimensional molded object according to claim 1, wherein the resin contained in the object molding liquid has at least any one of a structural unit represented by the following structural formula (1) and a structural unit represented by the following structural formula (2).

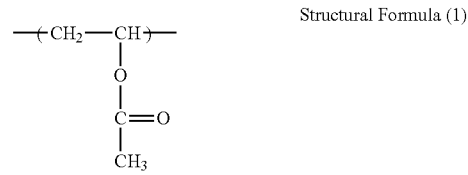

Structural Formula (1)

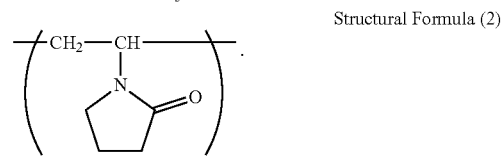

Structural Formula (2)

4. The method for producing a three-dimensional molded object according to claim 1,
wherein the removing includes removing the excessive powder for molding adhering to the solidified object by ultrasonic treatment.

5. A set comprising:
an object molding liquid containing a resin; and
a cleaning liquid for excessive powder removal containing a hydrocarbon solvent having an octanol/water partition coefficient ($logP_{ow}$ value) of 4.5 or more,
wherein the resin is soluble in a solvent A, and an octanol/water partition coefficient ($logP_{ow}$ value) of the solvent A is −1.8 or more and 3.4 or less.

6. The method for producing a three-dimensional molded object according to claim 1, wherein the hydrocarbon solvent has an octanol/water partition coefficient ($logP_{ow}$ value) of 5.0 or more.

7. The method for producing a three-dimensional molded object according to claim 1, wherein the hydrocarbon solvent contains no double bond in a molecule.

8. The method for producing a three-dimensional molded object according to claim 1, wherein the hydrocarbon solvent is a hydrocarbon having 7 or more and 15 or less carbon atoms.

9. The method for producing a three-dimensional molded object according to claim 1, wherein the hydrocarbon solvent contains at least one member selected from the group consisting of decane, undecane, dodecane, tridecane, tetradecane, and p-menthane.

10. The method for producing a three-dimensional molded object according to claim 3, wherein the resin contained in the object molding liquid has a structural unit represented by the structural formula (1).

11. The method for producing a three-dimensional molded object according to claim 3, wherein the resin contained in the object molding liquid has a structural unit represented by the structural formula (2).

12. The method for producing a three-dimensional molded object according to claim 1, wherein the hydrocarbon solvent contains at least one member selected from the group consisting of undecane, tridecane, tetradecane, and p-menthane.

13. The set according to claim 5, wherein the hydrocarbon solvent contains at least one member selected from the group consisting of undecane, tridecane, tetradecane, and p-menthane.

14. The method for producing a three-dimensional molded object according to claim 1, wherein the powder for molding comprises aluminum.

15. The method for producing a three-dimensional molded object according to claim 12, wherein the powder for molding comprises aluminum.

16. The method for producing a three-dimensional molded object according to claim 1, wherein the hydrocarbon solvent has an octanol/water partition coefficient ($logP_{ow}$ value) of 5.0 or more and 8.0 or less.

17. The method for producing a three-dimensional molded object according to claim 1, wherein the cleaning liquid consists of the hydrocarbon solvent.

18. The set according to claim 5, wherein the cleaning liquid consists of the hydrocarbon solvent.

19. The method for producing a three-dimensional molded object according to claim 1, wherein the resin contained in the object molding liquid comprises polyvinyl acetate, polyvinyl butyral, or polyvinyl pyrrolidone.

20. The method for producing a three-dimensional molded object according to claim 19, wherein the hydrocarbon solvent contains at least one member selected from the group consisting of decane, dodecane, tetradecane, and p-menthane.

\* \* \* \* \*